United States Patent [19]
Sakamoto

[11] Patent Number: 6,160,330
[45] Date of Patent: Dec. 12, 2000

[54] THREE-PHASE STEPPING MOTOR AND DRIVING METHOD THEREFOR

[75] Inventor: Masafumi Sakamoto, Kiryu, Japan

[73] Assignee: Japan Servo Co., LTD, Tokyo-to, Japan

[21] Appl. No.: 09/189,405

[22] Filed: Nov. 10, 1998

[30] Foreign Application Priority Data

Nov. 12, 1997 [JP] Japan .................................. 9-325197

[51] Int. Cl.$^7$ .................................................. H02K 37/14
[52] U.S. Cl. .................. 310/49 R; 310/112; 310/114; 310/126; 310/180; 310/179; 310/162; 310/187; 310/156; 310/254; 310/261; 318/696; 318/685
[58] Field of Search .................................. 310/49 R, 112, 310/114, 126, 179, 180, 162, 187, 156, 254, 261; 318/696, 685

[56] References Cited

U.S. PATENT DOCUMENTS

| | | | |
|---|---|---|---|
| 3,599,069 | 8/1971 | Welch | 318/138 |
| 4,031,419 | 6/1977 | Spiesberger et al. | 310/49 R |
| 4,206,374 | 6/1980 | Goddijn | 310/49 R |
| 4,234,808 | 11/1980 | Geppert et al. | 310/49 R |
| 4,663,577 | 5/1987 | Satomi | 318/696 |
| 4,672,253 | 6/1987 | Tajima et al. | 310/269 |
| 4,675,564 | 6/1987 | Isozaki | 310/49 R |
| 4,764,697 | 8/1988 | Christiaens | 310/49 R |
| 4,983,867 | 1/1991 | Sakamoto | 310/49 R |
| 5,097,162 | 3/1992 | Wang | 310/49 R |
| 5,128,570 | 7/1992 | Isozaki | 310/49 R |
| 5,289,064 | 2/1994 | Sakamoto | 310/49 R |
| 5,315,192 | 5/1994 | Satomi | 310/49 R |
| 5,321,340 | 6/1994 | Tamaki et al. | 318/696 |
| 5,374,865 | 12/1994 | Yoshimura et al. | 310/49 R |
| 5,386,161 | 1/1995 | Sakamoto | 310/49 R |
| 5,532,531 | 7/1996 | Sakamoto | 310/49 R |
| 5,610,492 | 3/1997 | Leung et al. | 318/701 |
| 5,747,898 | 5/1998 | Yoshimura et al. | 310/49 R |
| 5,780,944 | 7/1998 | Sakamoto | 310/49 R |

*Primary Examiner*—Nestor Ramirez
*Assistant Examiner*—Thanh Lam
*Attorney, Agent, or Firm*—Oblon, Spivak, McClelland, Maier & Neustadt, P.C.

[57] ABSTRACT

A three-phase stepping motor comprising: a rotation shaft rotatably supported by a pair of bearings provided in predetermined places of a housing so as to be in opposition to each other; a permanent-magnet rotor formed in a cylindrical shape so as to have south (S) and north (N) poles magnetized alternately in the direction of rotation on an outer circumferential portion of the rotor, or an induced magnetization rotor having S and N poles disposed alternately in the direction of rotation which are formed in a manner so that permanent magnets with the same polarity are fitted or formed so as to be identical in polarity at their surfaces in grooves formed parallelly to each other at a regular pitch in a surface of a magnetic body formed to be cylindrical in parallel to the rotation shaft and the cylindrical magnetic body is subjected to induced magnetization to form the S and N poles alternately in the surface of the cylindrical magnetic body; and a stator disposed so as to be in opposition to a surface of one of the rotors through a gap of a predetermined size, the stator having main poles the number of which is a multiple of 3, each of the main pole having a predetermined number of pole teeth and having a stator coil mounted thereon.

10 Claims, 22 Drawing Sheets

| STEP | DIRECTION OF CURRENT | POLARITY OF MAIN POLE | | | | | |
|---|---|---|---|---|---|---|---|
| | | 1a | 1b | 1c | 1d | 1e | 1f |
| 1 | I → II | S | S | | N | N | |
| 2 | III → II | | S | S | | N | N |
| 3 | III → I | N | | S | S | | N |
| 4 | II → I | N | N | | S | S | |
| 5 | II → III | | N | N | | S | S |

| STEP | DIRECTION OF CURRENT | POLARITY OF MAIN POLE ||||||
|---|---|---|---|---|---|---|---|
| | | 1a | 1b | 1c | 1d | 1e | 1f |
| 1 | I → II | S | N | | S | N | |
| 2 | III → II | | N | S | | N | S |
| 3 | III → I | N | | S | N | | S |
| 4 | II → I | N | S | | N | S | |
| 5 | II → III | S | | N | S | | N |

FIG. 20

| STEP | SWITCHING ELEMENT | | | | | | POLARITY OF MAIN POLE | | | | | |
|---|---|---|---|---|---|---|---|---|---|---|---|---|
| | T11 | T12 | T21 | T22 | T31 | T32 | 1a | 1b | 1c | 1d | 1e | 1f |
| 1 | ON | | | ON | | | S | N | | S | N | |
| 2 | ON | | | ON | ON | | S | N | S | S | N | S |
| 3 | | ON | | ON | ON | | | N | S | | N | S |
| 4 | | ON | ON | ON | ON | | N | N | S | N | N | S |
| 5 | | ON | ON | | | | N | S | S | N | | S |
| 6 | | ON | ON | | ON | ON | N | S | | N | S | |
| 7 | | | ON | | ON | ON | N | S | N | N | S | N |
| 8 | | | ON | | | ON | | S | N | | S | N |
| 9 | ON | | | | | ON | S | N | N | S | S | N |
| 10 | ON | | | | | ON | S | | N | S | S | N |
| 11 | ON | | | ON | | | S | N | N | S | N | N |
| 12 | ON | | | ON | | | S | N | | S | N | |
| 13 | ON | | | | | | | | | | | |
| → | → | → | → | → | → | → | → | → | → | → | → | → |

FIG. 21

| STEP | SWITCHING ELEMENT | | | | | | POLARITY OF MAIN POLE | | | | | |
|---|---|---|---|---|---|---|---|---|---|---|---|---|
| | T11 | T12 | T21 | T22 | T31 | T32 | 1a | 1b | 1c | 1d | 1e | 1f |
| 1 | ON | | | ON | | | S | S | | N | N | |
| 2 | ON | | | ON | ON | | S | S | S | N | N | N |
| 3 | | ON | ON | ON | ON | | | S | S | | N | N |
| 4 | | ON | ON | ON | ON | | N | S | S | S | N | N |
| 5 | | ON | ON | | ON | | N | N | S | S | | N |
| 6 | | ON | ON | | | ON | N | N | S | S | S | N |
| 7 | | | ON | | | ON | N | N | | S | S | |
| 8 | | | | | | ON | N | N | N | | S | S |
| 9 | ON | | ON | | | ON | S | | N | N | S | S |
| 10 | ON | | | ON | | ON | S | S | N | N | | S |
| 11 | ON | | | ON | | | S | S | N | N | N | S |
| 12 | ON | | | ON | | | S | | | N | N | |
| 13 | ON | | | | | | | | | | | |
| → | → | → | → | → | → | → | → | → | → | → | → | → |

FIG. 24

| STEP | SWITCHING ELEMENT | | | | | |
|---|---|---|---|---|---|---|
| | $T_{11}$ | $T_{12}$ | $T_{21}$ | $T_{22}$ | $T_{31}$ | $T_{32}$ |
| (1)-(2) | ON | | | ON | | |
| (2)-(2') | ON | | | ON | ON | |
| (2')-(3) | ON | | | ON | ON | ON |
| (3)-(4) | | | | ON | ON | |
| (4)-(4') | | ON | | ON | ON | |
| (4')-(5) | | ON | | ON | ON | |
| (5)-(6) | | ON | | | ON | |
| (6)-(6') | | ON | ON | | ON | |
| (6')-(7) | | ON | ON | | ON | |
| (7)-(8) | | ON | ON | | | |
| (8)-(8') | | ON | ON | | | ON |
| (8')-(9) | | ON | ON | | | ON |
| (9)-(10) | | | ON | | | ON |
| (10)-(10') | ON | | ON | | | ON |
| (10')-(11) | ON | | ON | | | ON |
| (11)-(12) | ON | | | | | ON |
| (12)-(12') | ON | | | ON | | ON |
| (12')-(13) | ON | | | ON | | ON |
| ↓ | ↓ | ↓ | ↓ | ↓ | ↓ | ↓ |

(A)

(B)

THREE-PHASE STEPPING MOTOR AND DRIVING METHOD THEREFOR

BACKGROUND OF THE INVENTION

1. Field of the Invention

The present invention relates to a three-phase stepping motor and a method for driving such a motor for use in an OA apparatus such as a printer, a copying machine, or the like. The invention particularly relates to a three-phase stepping motor in which low vibration can be obtained, and a practical driving method for such a three-phase stepping motor in which low vibration can be obtained by an inexpensive means.

2. Description of the Related Art

Conventionally, a stepping motor using a permanent magnet for a rotor is often used for driving a rotation portion of an office machine such as a printer, a high-speed facsimile equipment, a normal-paper copying machine, or the like, because of the high efficiency of the stepping motor. A two-phase stepping motor is chiefly employed for use which requires a medium level of accuracy, while a three-phase stepping motor superior in cost performance is employed for use which requires a high level of accuracy, low vibration, low noise, etc.

As a stepping motor for use in an office machine such as a laser printer, a facsimile equipment, or the like, which requires high accuracy in positioning, a three-phase stepping motor constituted by a cylindrical permanent-magnet rotor having numbers of magnets formed cylindrically or a hybrid rotor having a permanent magnet disposed between two magnetic plates provided with numbers of pole teeth, and a stator having pole teeth formed in opposition to the surface of this rotor, is often employed because high resolution and high torque can be obtained in such a three-phase stepping motor.

Two-phase/three-phase excitation for driving a three-phase stepping motor is generally executed as shown conceptually in FIGS. 32 and 33.

FIG. 32 shows a case of two-phase excitation, and FIG. 33 shows a case of three-phase excitation.

As seen in FIGS. 32 and 33, three series circuits of switching elements, such as transistors, $T_{11}$ and $T_{12}$, $T_{21}$ and $T_{22}$, and $T_{31}$ and $T_{32}$ are connected between the output terminals of a DC power source E. The junction points of the respective three series circuits are connected to three terminals of a coil I wound on a main pole 31a of a first phase, a coil II wound on a main pole 31b of a second phase, and a coil III wound on a main pole 31c of a third phase, respectively. The coils I, II and III are connected into a star connection.

In the circuit of FIG. 32, when two-phase excitation is executed so that the switching elements $T_{11}$ and $T_{32}$ are turned on, an electric current flows as shown by the arrow in FIG. 32. As a result, the main pole 31a of the first phase is excited to be a south (S) polarity, and the main pole 31c of the third phase is excited to be a north (N) polarity.

Accordingly, the N pole of a rotor 32 is attracted to the S pole formed in the first-phase main pole 31a, and the S pole of the rotor 32 is attracted to the N pole formed in the third-phase main pole 31c, so that the rotor 32 is set to a position shown in FIG. 32.

In the circuit of FIG. 33, when three-phase excitation is executed so that the switching elements $T_{11}$, $T_{22}$ and $T_{32}$ are turned on, an electric current flows as shown by the arrow in FIG. 33. As a result, each of the main pole 31a of the first phase and the main pole 31b of the second phase is excited into S poles, and the main pole 31c of the third phase is excited into an N pole. Accordingly, the N pole of the rotor 32 is attracted to the S poles formed in the first-phase main pole 31a and the second-phase main pole 31b, and the S pole of the rotor 32 is attracted to the N pole formed in the third-phase main pole 31c, so that the rotor 32 is set to a position shown in FIG. 33.

Similarly to the above-mentioned manner, the six switching elements are turned on sequentially, so that the state shown in FIGS. 32 and 33 is rotated to make the rotor 32 rotate clockwise sequentially.

As is understood from FIGS. 32 and 33, there is a difference in the electric current value supplied from the power source between the two-phase excitation and the three-phase excitation.

The state of torque generated in the above-mentioned excitation can be shown in a vector diagram of FIG. 34.

In FIG. 34, $\tau_1$ designates torque generated in any one main pole having a coil mounted thereon when an electric current is applied only to that coil, and $\tau_{2-1}$, $\tau_{2-3}$ and $\tau_{2-5}$ designate the vector sum of torque generated in the main poles sequentially when the switching elements are turned on sequentially in two-phase excitation shown in FIG. 32.

Further, $\tau_{3-2}$ and $\tau_{3-4}$ designate the vector sum of torque generated in the main poles when the respective switching elements are turned on sequentially in three-phase excitation shown in FIG. 33.

Accordingly, as is apparent from FIG. 34, $$\tau_2 = \sqrt{3}\tau_1$$

$$\tau_3 = 2\tau_1$$

are established.

That is, since the load circuit viewed from the power source at the time of two-phase excitation is different from that at the time of three-phase excitation, the electric current value supplied from the power source becomes different between the two-phase/three-phase excitations so that the electric current value at the time of three-phase excitation becomes 3/2 times as large as that at the time of two-phase excitation.

In addition, constant-current driving is superior to constant-voltage driving to drive a stepping motor at a high speed. Accordingly, constant-current driving is broadly used practically.

In order to obtain damping characteristics necessary for braking a rotor quickly to improve the positioning accuracy of three-phase stepping coils connected into a star-connection, a complicated damping circuit is used, or a mechanical damper or the like is used.

As for such a two-phase permanent-magnet stepping motor as mentioned above, there are those which are disclosed in U.S. Pat. No. 4,983,867, U.S. Pat. No. 5,128,570, U.S. Pat. No. 5,289,064, U.S. Pat. No. 5,386,161, and U.S. Pat. No. 5,532,531.

To realize low vibration and low noise, various proposals have been made about half-step driving or micro-step driving, as disclosed, for example, in U.S. Pat. No. 3,599,069, U.S. Pat. No. 4,663,577, and U.S. Pat. No. 5,321,340.

The above U.S. Pat. No. 3,599,069 discloses a half-step driving method based on constant-voltage driving is disclosed, the U.S. Pat. No. 4,663,577 discloses a method based on five-phase step driving, and the U.S. Pat. No. 5,321,340 discloses a half-step driving method in a star-connection of a three-phase motor.

In addition, the technique disclosed in the U.S. Pat. No. 5,321,340 is basically identical with the technique disclosed in the U.S. Pat. No. 3,599,069. According to the half-step driving method described with reference to FIGS. 1 to 5 and FIG. 8 of the U.S. Pat. No. 5,321,340, three-phase electric currents are controlled so as to be equal to each other, so that the value of an electric current supplied from a power source at the time of three-phase excitation is larger than the value of an electric current supplied from the power source at the time of two-phase excitation. Therefore, claim 2 in the U.S. Pat. No. 5,321,340 defines a technique in which the value of an electric current supplied from the power source at the time of three-phase excitation is made smaller than the value of an electric current supplied from the power source at the time of two-phase excitation to thereby make the torque substantially equal both in the three-phase excitation and two-phase excitation.

Each of the methods disclosed in the above-mentioned U.S. Patents is insufficient for optimization of magnetic paths and stator tooth width for three-terminal driving which can realize lower vibration.

In addition, the micro-step driving was expensive in its driving circuit, and the conventional half-step driving system was complicated in practical use.

Further, as described above with reference to FIGS. 32 to 34, an electric current value at the time of three-phase excitation becomes 3/2 times as large as that at the time of two-phase excitation. Accordingly, unevenness appears in driving torque. Particularly in a motor designed such that a stator has no pole teeth as shown in FIGS. 32 and 33, steps cannot be made small so that lowering in positioning accuracy or unevenness in rotation occurs more seriously because of a shortage of resolution. Accordingly, it is difficult to put such a motor into practical use.

In the case where the electric current value at the time of two-phase excitation was different from the electric current value at the time of three-phase excitation, there was a problem that electric current control became so complicated to make it difficult to perform expensive half-step driving such as two-phase/three-phase excitation.

Further, in the technique disclosed in U.S. Pat. No. 3,599,069, the driving circuit is of an old type, and complicated. On the other hand, the technique disclosed in U.S. Pat. No. 4,663,577 is mainly based on the assumption of five-phase step driving. Accordingly, if it is intended to apply this technique to three-phase full-step driving, claim 2 defining a case of star connection is not clear in its statement and fails to teach a technique for half-step driving, though claim 1 proposing a case of delta connection has a possibility to be applied to three-phase full-step driving.

In addition, the means, which is defined in claim 2 of U.S. Pat. No. 5,321,340, for making the value of an electric current supplied from a power source at the time of three-phase excitation smaller than that at the time of two-phase excitation so as to make the torque in the former case substantially equal to the torque in the latter case is practical in the constant-voltage driving. In the case of constant-current driving, however, the current detection means for making the electric current value supplied from the power source at the time of two-phase excitation different from that at the time of three-phase excitation are required to be provided at three places for the respective phases. Accordingly, there is an economical problem that a driving circuit cannot be formed inexpensively.

In order to perform positioning control in a three-phase stepping motor of star connection, a complicated damping circuit as mentioned above, a mechanical damper, or the like, is used, and there is no disclosure about an inexpensive technical means for improving the damping characteristic.

High resolution and high torque can be obtained in a three-phase motor having a cylindrical permanent-magnet rotor or a hybrid rotor, and a stator formed with pole teeth, as mentioned above. However, there is a disadvantage that a large number of harmonics are contained in field magnetic flux density generated in an air gap between the permanent magnet of the rotor and the stator, so that noise or vibration gets larger.

That is, the noise/vibration of a stepping motor is generated by a vibration torque component contained in the torque generated by the product of an excitation electric current and field magnetic flux density, so that the noise/vibration is affected by harmonic components contained in the excitation electric current and the field magnetic flux density.

While the amount of harmonic components in the field magnetic flux density is chiefly determined in accordance with the structure of the motor, the harmonic components in the excitation electric current can be reduced by micro-step driving or half-step driving such as two-phase/three-phase excitation.

However, the micro-step driving is so expensive that it is not always suitable for office machines. In addition, in a multi-pole motor as mentioned above, it is necessary to increase the number of poles to obtain high resolution. Accordingly, there was a problem that high-speed driving was difficult in constant-voltage driving.

In addition, there was another problem that the potential at a neutral point to which three-phase coils are connected fluctuates due to the excitation electric current to give influence on stable rotations of the motor.

Further, in a conventional three-phase stepping motor having, for example, six poles, if an electric current is made to flow into coils Ia and Ib for one phase as shown in FIG. 35, magnetic flux coming out from an N pole of a rotor returns to the same N pole of the rotor through an S pole of a stator and main poles of other phases as shown by a dot line in FIG. 35.

Therefore, the magnetic flux is affected by the magnetic change in the main poles due to a noise current or the like flowing in the other phases. Accordingly, there is a risk of lack of stability.

It is, therefore, required to improve the foregoing problems in the conventional techniques, and to provide a stepping motor and a driving method therefor by which half-step driving based on constant-current driving can be realized inexpensively.

It is an object of the present invention to solve the foregoing problems in the conventional techniques, and to provide a three-terminal driving type three-phase stepping motor based on a new magnetic path system by which low vibration can be obtained. In other words, it is an object of the present invention to provide a driving method of a stepping motor of three-phase star connection, including a proposal of the tooth width of the stator optimum for low vibration, and a half-step excitation system optimum for low vibration and low noise in which the three-phase stepping motor which is practical and can be formed at a low price is rotated smoothly. Accordingly, this driving method exhibits low vibration, improves damping characteristics, and has stability.

SUMMARY OF THE INVENTION

In order to achieve above the object, according to a first aspect of the present invention, provided is a three-phase stepping motor comprising: a rotation shaft rotatably supported by a pair of bearings provided in predetermined places of a housing so as to be in opposition to each other; a permanent-magnet rotor formed in a cylindrical shape so as to have south (S) and north (N) poles magnetized alternately in the direction of rotation on an outer circumferential portion of the rotor, or an induced magnetization rotor having S and N poles disposed alternately in the direction of rotation which are formed in a manner so that permanent magnets with the same polarity are fitted or formed so as to be identical in polarity at their surfaces in grooves formed parallelly to each other at a regular pitch in a surface of a magnetic body formed to be cylindrical in parallel to the rotation shaft and the cylindrical magnetic body is subjected to induced magnetization to form the S and N poles alternately in the surface of the cylindrical magnetic body, or a hybrid rotor constituted by two magnetic disks disposed on the rotation shaft perpendicularly thereto and a permanent magnet magnetized in the direction of rotation axis and held between the two magnetic disks, each of the two magnetic disks having pole teeth formed at a predetermined pitch at edge portions thereof, the two magnetic disks being displaced from each other in the direction of rotation by ½ of the predetermined; and a stator disposed so as to be in opposition to a surface of one of the rotors through a gap of a predetermined size, the stator having main poles the number of which is a multiple of 3, each of the main pole having a predetermined number of pole teeth and having a stator coil mounted thereon; wherein the following conditions are satisfied: (a) the number Q of the main poles is Q=6k, and k N-poles and k S-poles are formed in 2k main poles for each phase at the time of excitation of each phase, where k is an integer not smaller than 1; (b) the number $Nr_6$ of S and N pole pairs of the rotor is set to be $Nr_6=yk(6n\pm1)$, where n is an integer not smaller than 1 and y is ½ or 1; and (c) the stator coils are formed with three excitation feeding terminals of a star or delta connection.

According to a second aspect of the present invention, provided is a three-phase stepping motor comprising: a rotation shaft rotatably supported by a pair of bearings provided in predetermined places of a housing so as to be in opposition to each other; a permanent-magnet rotor formed in a cylindrical shape so as to have south (S) and north (N) poles magnetized alternately in the direction of rotation on an outer circumferential portion of the rotor, or an induced magnetization rotor having S and N poles disposed alternately in the direction of rotation which are formed in a manner so that permanent magnets with the same polarity are fitted or formed so as to be identical in polarity at their surfaces in grooves formed parallelly to each other at a regular pitch in a surface of a magnetic body formed to be cylindrical in parallel to the rotation shaft and the cylindrical magnetic body is subjected to induced magnetization to form the S and N poles alternately in the surface of the cylindrical magnetic body, or a hybrid rotor constituted by two magnetic disks disposed on the rotation shaft perpendicularly thereto and a permanent magnet magnetized in the direction of rotation axis and held between the two magnetic disks, each of the two magnetic disks having pole teeth formed at a predetermined pitch at edge portions thereof, the two magnetic disks being displaced from each other in the direction of rotation by ½ of the predetermined; and a stator disposed so as to be in opposition to a surface of one of the rotors through a gap of a predetermined size, the stator having at least three main poles, each of the main pole having a predetermined number of pole teeth and having a stator coil mounted thereon; wherein the following conditions are satisfied: (a) the number Q of the main poles is Q=3m; (b) the stator coils are formed with three excitation feeding terminals of a star or delta connection; and (c) the number $Nr_3$ of S and N pole pairs of the rotor is set to be $Nr_3=ym(3n\pm1)$, wherein each of m and n is an integer not smaller than 1, and y is ½ or 1.

According to a third aspect of the present invention, provided is a three-phase stepping motor comprising: a rotation shaft rotatably supported by a pair of bearings provided in predetermined places of a housing so as to be in opposition to each other; a permanent-magnet rotor formed in a cylindrical shape so as to have south (S) and north (N) poles magnetized alternately in the direction of rotation on an outer circumferential portion of the rotor, or an induced magnetization rotor having S and N poles disposed alternately in the direction of rotation which are formed in a manner so that permanent magnets with the same polarity are fitted or formed so as to be identical in polarity at their surfaces in grooves formed parallelly to each other at a regular pitch in a surface of a magnetic body formed to be cylindrical in parallel to the rotation shaft and the cylindrical magnetic body is subjected to induced magnetization to form the S and N poles alternately in the surface of the cylindrical magnetic body, or a hybrid rotor constituted by two magnetic disks disposed on the rotation shaft perpendicularly thereto and a permanent magnet magnetized in the direction of rotation axis and held between the two magnetic disks, each of the two magnetic disks having pole teeth formed at a predetermined pitch at edge portions thereof, the two magnetic disks being displaced from each other in the direction of rotation by ½ of the predetermined; and a stator disposed so as to be in opposition to a surface of one of the rotors through a gap of a predetermined size, the stator having at least three main poles, each of the main pole having a predetermined number of pole teeth and having a stator coil mounted thereon; wherein the following conditions are satisfied: (a) the number Q of the main poles is Q=6k, and k N-poles and k S-poles are formed in 2k main poles for each phase at the time of excitation of each phase, or the number Q of the main poles is Q=3m, and m main poles are formed with the same polarity for each phase at the time of excitation of each phase, where each of k and m is an integer not smaller than 1; (b) the stator coils are formed with three excitation feeding terminals of a star or delta connection; (c) a ratio of a tooth width of one of the pole teeth formed on each of the main poles of the stator to a pitch defined between the one pole tooth and another pole tooth adjacent to the one pole tooth is set to be not smaller than $[1-(\frac{2}{5})]/3$, and not larger than $[1+(\frac{2}{5})]/3$; (d) the number $Nr_3$ of S and N pole pairs of the rotor is set to be $Nr_3=ym(3n\pm1)$ in the case of Q=3m, where n is an integer not smaller than 1 and y is ½ or 1; and (e) the number $Nr_6$ of S and N pole pairs of the rotor is set to be $Nr_6=yk(6n\pm1)$ in the case of Q=6k.

According to a fourth aspect of the present invention, provided is a three-phase stepping motor comprising: a rotation shaft rotatably supported by a pair of bearings provided in predetermined places of a housing so as to be in opposition to each other; a permanent-magnet rotor formed in a cylindrical shape so as to have south (S) and north (N) poles magnetized alternately in the direction of rotation on an outer circumferential portion of the rotor, or an induced magnetization rotor having S and N poles disposed alternately in the direction of rotation which are formed in a manner so that permanent magnets with the same polarity are fitted or formed so as to be identical in polarity at their surfaces in grooves formed parallelly to each other at a regular pitch in a surface of a magnetic body formed to be cylindrical in parallel to the rotation shaft and the cylindrical magnetic body is subjected to induced magnetization to form the S and N poles alternately in the surface of the cylindrical magnetic body, or a hybrid rotor constituted by two magnetic disks disposed on the rotation shaft perpendicularly thereto and a permanent magnet magnetized in the direction of rotation axis and held between the two magnetic disks, each of the two magnetic disks having pole teeth formed at a predetermined pitch at edge portions thereof, the two magnetic disks being displaced from each other in the direction of rotation by ½ of the predetermined; and a stator disposed so as to be in opposition to a surface of one of the rotors through a gap of a predetermined size, the stator having at least three main poles, each of the main pole having a predetermined number of pole teeth and having a stator coil mounted thereon; wherein the following conditions are satisfied: (a) the number Q of the main poles is 6, and one N pole and one S pole are formed in 2 main poles for each phase at the time of excitation of each phase, or the number Q of the main poles is 6, and two main poles are formed with the same polarity for each phase at the time of excitation of each phase; (b) the outer shape of the stator is constituted by a portion or whole of four sides of a square, or the outer shape of the stator is an equilateral hexagon, and the rotor-side shape of a yoke portion connecting the main poles which form the stator is circular excluding the main pole portions, or the main poles of magnetic material are formed substantially in parallel with center axes, while the rotor-side shape of a yoke portion connecting the main poles is an equilateral hexagon including sides substantially perpendicular to the center axes.

According to a fifth aspect of the present invention, in the three-phase stepping motor according to any one of the above first to fourth aspects in which the coils are connected in a star connection, a neutral point of the star connection of the coils is connected to an intermediate potential point formed between a first power source and a second power source, or connected to the first power source and said second power source through capacitors with equal capacitance.

According to a sixth aspect of the present invention, in the three-phase stepping motor according to any one of the above first to fifth aspects in which coils are connected in a star connection with three excitation feeding terminals, provided is a method for driving the three-phase stepping motor wherein the following conditions are satisfied: (a) the excitation mode is set to two-phase/three-phase excitation; (b) an electric current supplied to the motor is controlled to take a predetermined electric current value in both cases of two-phase excitation and three-phase excitation; and (c) two-phase excitation and three-phase excitation are repeated alternately so that a ratio of torque at the time of two-phase excitation to torque at the time of three-phase excitation is substantially $\sqrt{1}3:1.5$.

According to a seventh aspect of the present invention, in the three-phase stepping motor according to any one of the above first to fifth aspects in which coils are connected in a star connection with three excitation feeding terminals, provided is a method for driving the three-phase stepping motor wherein the following conditions are satisfied: (a) the excitation mode is set to two-phase/three-phase excitation; and (b) the total amount of excitation electric currents supplied to the coils at the time of each excitation is kept zero, while the excitation electric current for each phase is changed in predetermined steps.

According to an eighth aspect of the present invention, in the three-phase stepping motor according to any one of the above first to fifth aspects in which coils are connected in a star connection with three excitation feeding terminals, provided is a method for driving the three-phase stepping motor wherein the following conditions are satisfied: (a) three pairs of switching elements connected in series in the forward direction in each pair are connected between a first power source having a predetermined value and a second power source having a predetermined value, and three excitation feeding terminals are connected to respective junction points of the pairs of switching elements; (b) diodes are connected or diode functions are formed in reversely parallel with the respective switching elements so that six sets of closed circuits are formed by the switching elements and the diodes; and (c) the switching elements are driven suitably so as to form an artificial excitation state in which a circulating electric current is made to flow in the closed circuits at an intermediate timing shifting from two-phase excitation to three-phase excitation so that two-phase excitation, artificial three-phase excitation and three-phase excitation are carried out repeatedly.

According to a ninth aspect of the present invention, in the three-phase stepping motor according to any one of the above first to fifth aspects in which coils are connected in a star connection with three excitation feeding terminals, provided is a method for driving the three-phase stepping motor wherein the following conditions are satisfied: (a) the excitation mode is set in two-phase/three-phase excitation, or two-phase/artificial-three-phase/three-phase excitation; and (b) an electric current supplied to the motor is made larger at the time of three-phase excitation than at the time of two-phase excitation, so as to make torque at the time of two-phase excitation substantially equal to torque at the time of three-phase excitation.

According to a tenth aspect of the present invention, in a three-phase distribution type claw-pole stepping motor or in a three-phase cascade type claw-pole stepping motor, wherein each of the three-phase distribution type claw-pole stepping motor and the three-phase cascade type claw-pole stepping motor comprises: a rotation shaft rotatably supported by a pair of bearings provided in predetermined places of a housing so as to be in opposition to each other; a permanent-magnet rotor formed in a cylindrical shape so as to have south (S) and north (N) poles magnetized alternately in the direction of rotation on an outer circumferential portion of the rotor, or an induced magnetization rotor having S and N poles disposed alternately in the direction of rotation which are formed in a manner so that permanent magnets with the same polarity are fitted or formed so as to be identical in polarity at their surfaces in grooves formed parallelly to each other at a regular pitch in a surface of a magnetic body formed to be cylindrical in parallel to the rotation shaft and the cylindrical magnetic body is subjected to induced magnetization to form the S and N poles alternately in the surface of the cylindrical magnetic body; and wherein the three-phase distribution type claw-pole stepping motor further comprises: a stator having 3m claw-pole type magnetic pole tooth groups disposed in opposition to the surface of one of the rotors through an air gap of a predetermined size, each group being provided with a predetermined number of pole teeth disposed opposite to each other from the right and left and gearing with each other at a predetermined gap, and formed circumferentially in the direction of rotation of the rotation shaft; and coils distributed coaxially in a plane perpendicular to the rotation shaft in back portions of the respective magnetic pole tooth groups; and wherein the three-phase cascade type claw-pole stepping motor comprises: a stator constituted by three stator units for the respective phases, each stator unit being provided with a predetermined number of pole teeth disposed in opposition to all over the circumference of the one rotor from the right and left, and having an annular coil disposed coaxially with the pole teeth between a pair of yoke elements gearing with each other at a predetermined distance, the stator units being displaced by rotating by 60/Nr degrees or 120/Nr degrees successively in the circumferential direction, or the rotor being constituted by rotor units for the three phases correspondingly to the stator units, the rotor units being displaced by rotating by 60/Nr degrees or 120/Nr degrees successively in the circumferential direction, while the three phase stator units being disposed in the same circumferential positions; a method for driving the three-phase stepping motor wherein the following conditions are satisfied:(a) in the case of the distribution type claw-pole stepping motor, the number of the pole tooth groups and the number Q of the coils are Q=3m, the number $Nr_c$ of S and N pole pairs of the rotor is $Nr_c$=m(3n±1), and there are provided three excitation feeding terminals of a star connection; (b) in the case of the cascade type claw-pole stepping motor, there are provided three excitation feeding terminals of a star connection or delta connection; and (c) the excitation mode is set to a two-phase/three-phase excitation mode, and two-phase excitation and three-phase excitation are alternately repeated so that an electric current supplied to the motor takes a predetermined electric current value either in two-phase excitation or in three-phase excitation; or instead the two-phase/three-phase excitation mode, the excitation mode is set to a two-phase/artificial-three-phase/three-phase excitation; wherein m is an integer of 1 or 2, and n is an integer of 1 or more.

BRIEF DESCRIPTION OF THE DRAWINGS

FIG. 20 is a table with respect to the driving steps in the two-phase/three-phase excitation in the ninth embodiment;

FIG. 21 is a table with respect to the driving steps in the two-phase/three-phase excitation in a tenth embodiment;

FIG. 24 is a table with respect to the driving steps in artificial two-phase/three-phase excitation in a thirteenth embodiment;

DESCRIPTION OF THE PREFERRED EMBODIMENTS

First Embodiment

An embodiment of the present invention will be described in detail with reference to the drawings.

Figure 1:
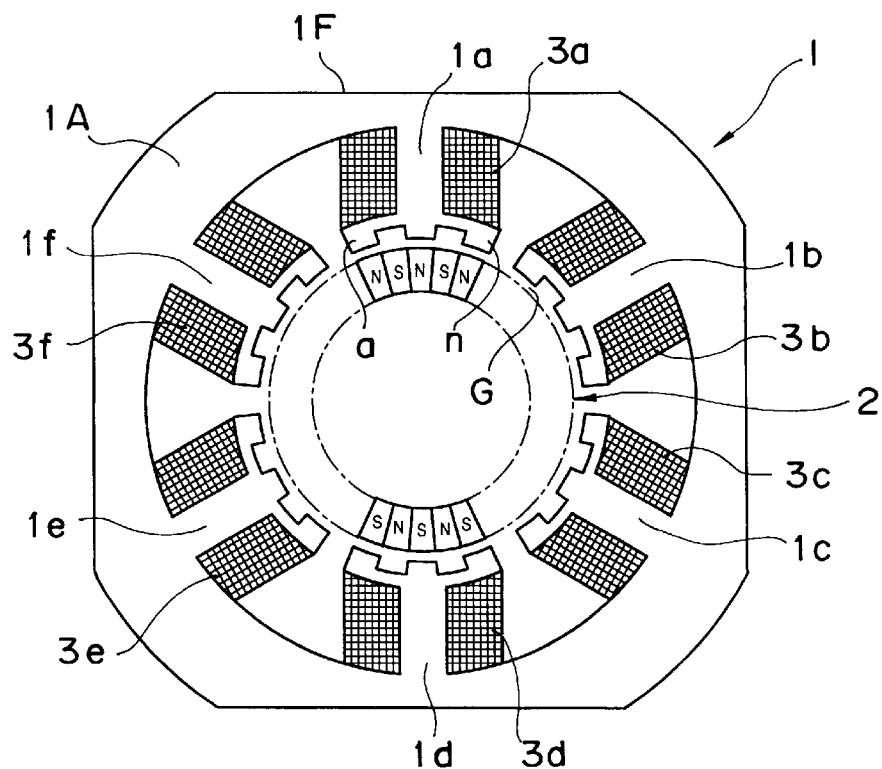
FIG. 1 is a vertically sectioned front view of the basic functional configuration of a three-phase stepping motor for explaining a first embodiment formed based on the technical thought according to the present invention.
Figure 2:
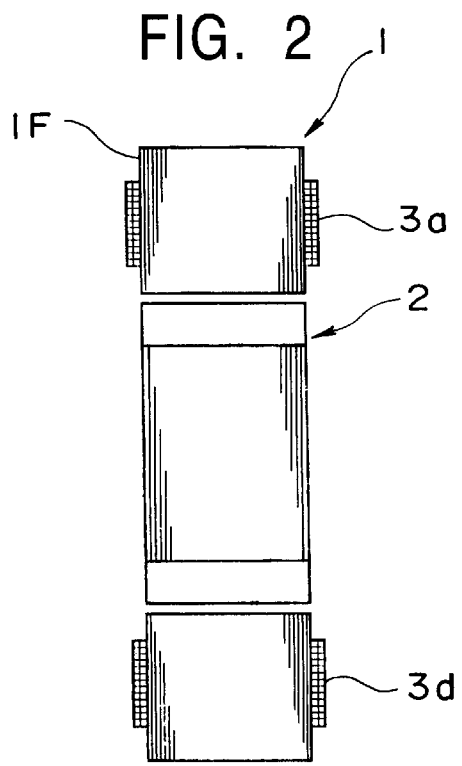
FIG. 2 is a side view of the three-phase stepping motor shown in FIG. 1.

FIG. 1 is a vertically sectioned front view for explaining a basic functional configuration of a three-phase stepping motor according to the present invention (hereinafter simply referred to as "motor"). FIG. 2 is a side view of FIG. 1.

In FIGS. 1 and 2, the reference numeral 1 represents a stator; 2, a rotor the rotation shaft of which is not shown; and 3a to 3f, coils wound on main poles 1a to 1f of the stator 1 respectively.

The stator main poles 1a to 1f are formed integrally with a yoke portion 1A so as to constitute a stator iron core 1F.

The outer shape of the yoke portion 1A is substantially square with its four corners being shaped into arcs, as is clearly shown in FIG. 1.

The stator iron core 1F constituted by the yoke portion 1A and the six main pole portions 1a to 1f may be formed by lamination of magnetic iron plates such as silicon steel plates or the like punched out into a predetermined shape, or may be formed from other means, for example, a molding of dust core or a sintered alloy, having a predetermined shape.

Each of the respective stator main poles 1a to 1f has a predetermined number of pole teeth a to n which are formed at predetermined pitch and width so as to be in opposition to the rotor 2. An air gap G having a predetermined size is formed between each pole tooth and the rotor 2.

In FIG. 1, three pole teeth are illustrated in each of the stator main poles 1a to 1f.

The rotor 2 is formed from a cylindrical permanent magnet the outer circumference of which is magnetized in N and S poles alternately.

An induced magnetization motor having another structure of a rotor applicable to the present invention will be described with reference to FIGS. 3 and 4.

This motor is different only in the structure of a rotor from the motor of FIGS. 1 and 2, but the other structure and configuration are the same as those of the motor shown in FIGS. 1 and 2. Accordingly, in FIGS. 3 and 4, constituent parts the same as those in FIGS. 1 and 2 are referenced correspondingly, and detailed description thereof will be omitted here.

Figure 3:
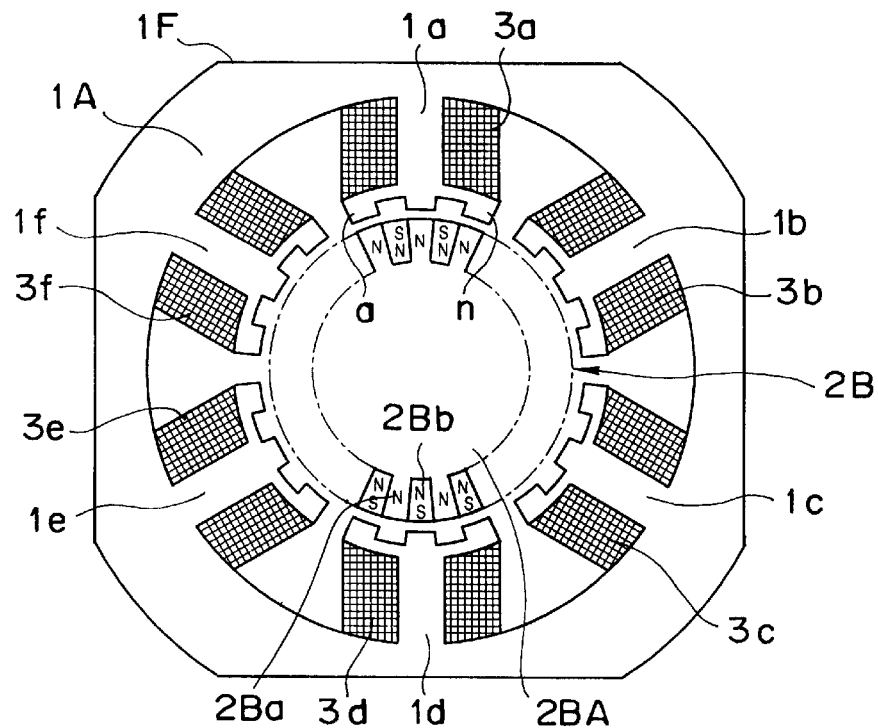
FIG. 3 is a vertically sectioned front view for explaining the basic functional configuration of a three-phase stepping motor using an induced magnetization type rotor, as a modification of the first embodiment.
Figure 4:
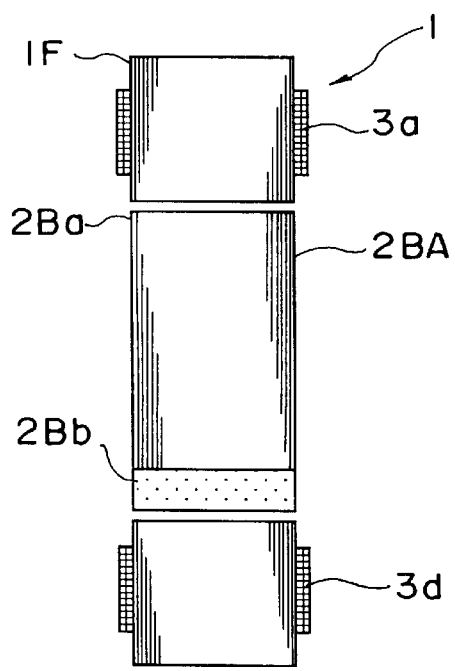
FIG. 4 is a side view of the three-phase stepping motor shown in FIG. 3.

In FIGS. 3 and 4, the reference numeral 2B represents a rotor. In the rotor 2B, a cylindrical rotor iron core 2BA having a predetermined number of pole teeth 2Ba formed on its outer circumference is coupled with a rotation shaft which is not shown.

Permanent magnets 2Bb are buried with predetermined polarity, in the grooves between the respective pole teeth 2Ba of the rotor iron core 2BA, so that, for example, S poles of the permanent magnets 2Bb are arranged on the outer surface of the rotor. Therefore, being induced by the permanent magnets, the respective pole teeth 2Ba become N poles.

Accordingly, the motor of this structure functions in the same manner as the motor described above with respect to FIGS. 1 and 2.

Although the permanent magnets are buried in the grooves between the respective pole teeth 2Ba of the rotor iron core 2BA in the above description, they may be formed by magnetization of the rotor core in the radial direction.

The surface of the magnet constituting the induced magnetization rotor may be monopolar. Accordingly, it is easy to magnetize the rotor into N and S poles alternately, and it is possible to ensure a large number of teeth so that the step angle can be reduced. Accordingly, it is possible to obtain a high-resolution motor.

Next, a hybrid motor having another structure of a rotor applicable to the present invention will be described with reference to FIGS. 5 and 6.

This hybrid motor is different only in the structure of a rotor from the motor of FIGS. 1 and 2, but the other structure and conditions are the same as those of the motor shown in FIGS. 1 and 2. Accordingly, in FIGS. 5 and 6, constituent parts the same as those in FIGS. 1 and 2 are referenced correspondingly, and detailed description thereof will be omitted here.

Figure 5:
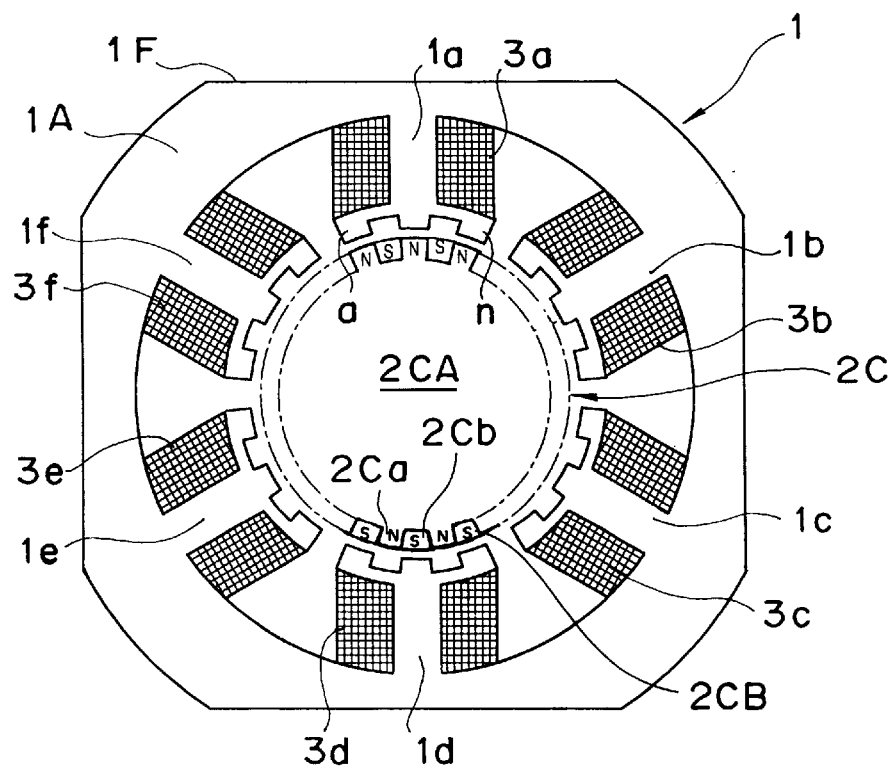
FIG. 5 is a vertically sectioned front view for explaining the basic functional configuration of a three-phase stepping motor using a hybrid rotor, as a modification of the first embodiment.
Figure 6:
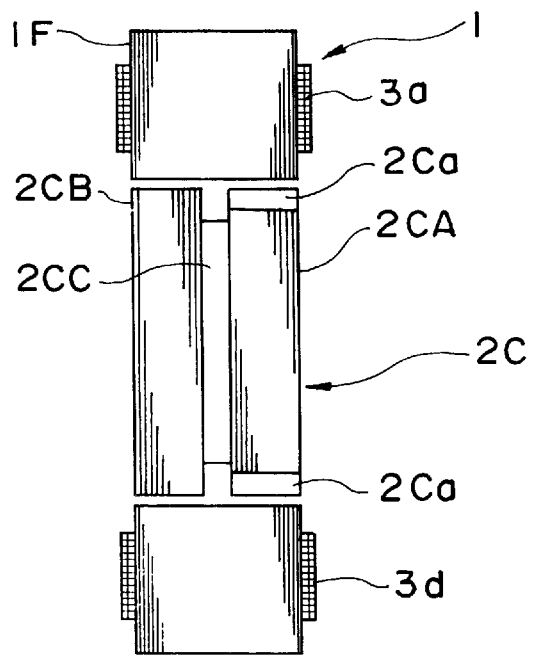
FIG. 6 is a side view of the three-phase stepping motor shown in FIG. 5.

In FIGS. 5 and 6, the reference numeral 2C represents a rotor. The rotor 2C is formed in a manner so that two identical disc rotor iron cores 2CA and 2CB of magnetic material, and a permanent magnet 2CC magnetized in the direction of rotation axis and disposed between the rotor iron cores 2CA and 2CB. Each of the rotor iron cores 2CA and 2CB has a predetermined number of pole teeth 2Ca formed on its outer circumference with the same width and at a predetermined pitch and the two rotor iron cores 2CA and 2CB are displaced from each other by rotation by ½ pitch of the pole teeth.

Therefore, as shown in FIG. 5, for example, if the rotor iron core 2CA on this side has an N pole due to the polarity of the permanent magnet 2CC, the rotor iron core 2CB on the other side has an S pole.

Accordingly, the motor of this structure functions in the same manner as the motor described in FIGS. 1 and 2. In addition, in a hybrid motor, it is easy to increase the number of magnetic poles of a rotor structurally, so that it is possible to obtain a high-resolution motor.

For example, it is possible to manufacture a hybrid motor in which the outer size of a rotor is 15 mm, and the number of magnetic pole pairs Nr is 50, and it is possible to obtain a motor in which the pole tooth width of the rotor is about 0.5 mm, and the step angle is 60/50=1.2 degrees in the case of a three-phase motor.

Figure 7:
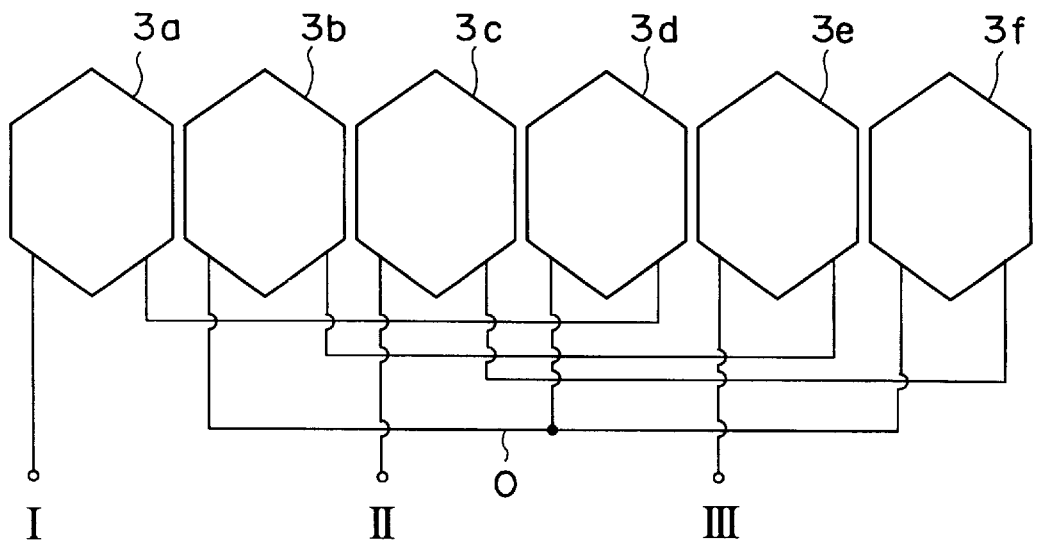
FIG. 7 is a schematic coil circuit diagram showing an example of connection of the coils in the first embodiment.

FIG. 7 shows a connection example of coils in the thus configured motor according to the present invention.

In FIG. 7, the reference numerals 3a to 3f represent coils wound on stator main poles 1a to 1f respectively, as mentioned above. The fourth coil 3d is reversely connected to the first coil 3a.

That is, for example, the winding start of the first coil 3a is led out as a terminal of a first-phase coil I, the winding end of the first coil 3a is connected to the winding end of the fourth coil 3d, and the winding start of the fourth coil 3d is connected to a common junction point o to which the winding start of the second coil 3b and the winding start of the sixth coil 3f are connected.

In the same manner, the second coil 3b is reversely connected to the fifth coil 3e. The winding start of the fifth coil 3e is led out as a terminal of a second-phase coil II. The sixth coil 3f is reversely connected to the third coil 3c. The winding start of the third coil 3c is led out as a terminal of a third-phase coil III.

That is, the thus configured motor is provided as a six-pole three-phase motor. The first coil 3a and the fourth coil 3d form a first-phase coil I. The fifth coil 3e and the second coil 3b form a second-phase coil II. The third coil 3c and the sixth coil 3f form a third-phase coil III.

As a result, for example, when an electric current is supplied to the first-phase coil I so as to excite the first stator main pole 1a into an S pole, all the pole teeth of the first stator main pole 1a become S poles. At the same time, the fourth stator main pole 1d is excited into an N pole, so that all the pole teeth of the fourth stator main pole 1d become N poles.

Accordingly, in this case, being shown by magnetic poles of only one phase formed by the stator main poles 1a and 1d, permanent magnets of a rotor 2 are located in the position shown in FIG. 1.

Figure 8:
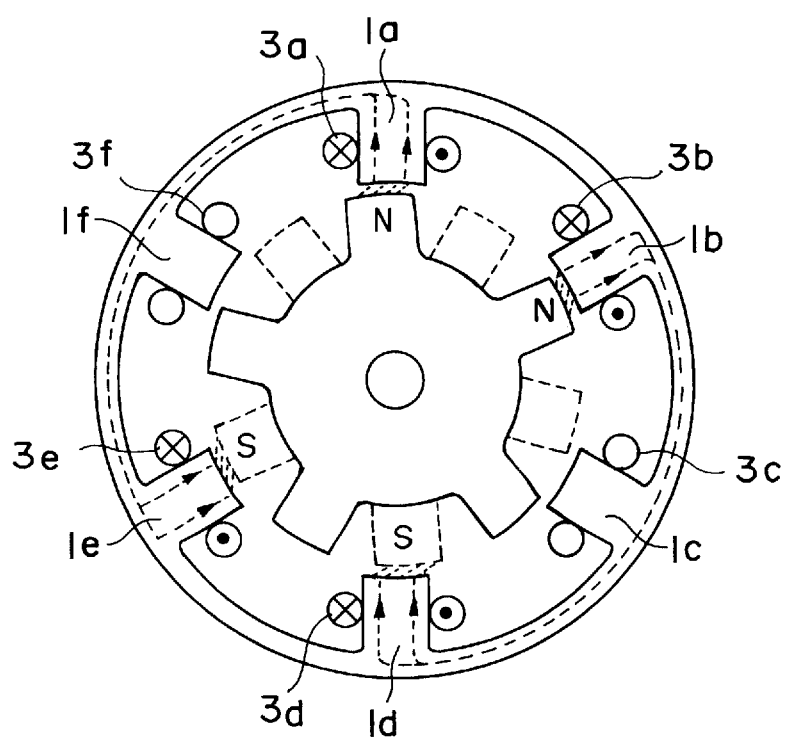
FIG. 8 is a vertically sectioned front view for explaining the function in the first embodiment by means of a hybrid three-phase stepping motor.

As for the above-mentioned function, the operation of a motor shown in FIG. 8 will be described in detail with reference to FIG. 1 as well as FIG. 8. FIG. 8 shows a hybrid motor in which the above-mentioned function is simplified such that the outer shape of a stator is made to be circular, and pole teeth of main poles are omitted to facilitate understanding of the magnetic flux paths.

That is, for example, when an excitation electric current is supplied from the first-phase coil I to the second-phase coil II, the first stator main pole 1a and the second stator main pole 1b are excited into S poles, and the fourth stator main pole 1d and the fifth stator main pole 1e are excited into N poles. As a result, the rotor 2 is located in the position shown in FIG. 8. When the rotor is located in this position, the magnetic flux circulates from an N pole of the permanent magnet of the rotor to an S pole of the permanent magnet of the rotor through the air gap G, the pole teeth of the first stator main pole 1a, the yoke portion 1A, the pole teeth of the fifth stator main pole 1e and the air gap G, and at the same time, the magnetic flux further circulates from another N pole of the permanent magnet of the rotor to another S pole of the permanent magnet of the rotor through the air gap G, the pole teeth of the second stator main pole 1b, the yoke portion 1A, the pole teeth of the fourth stator main pole 1d and the air gap G. That is, the magnetic flux operates effectively with the minimum magnetic resistance without passing through any other main poles.

Although the shape of the rotor is simplified and the pole teeth of the stator are not shown in FIG. 8, the number of permanent magnet pairs of the rotor in the motor shown in FIG. 1 according to the present invention is set to satisfy the following expression (2) under the conditions satisfying the following expression (1).

$$Q=6k \quad (1)$$

$$Nr_6=yk(6n\pm1) \quad (2)$$

where Q designates the number of main poles; $Nr_6$, the number of S and N pole pairs of the rotor; k and n, integers not smaller than 1; and y, ½ or 1.

Accordingly, for example, Q=12 when k=2. In this case, for every phase, it is preferable to select every third one of all the 12 coils, that is, four coils, at an interval of a mechanical angle of 90 degrees. However, the four coils may be selected so that two coils are disposed adjacent to each other, and the rest two coils are disposed adjacent to each other and separated by 180 degrees from the former two coils respectively in the same direction.

In this case, in the above-mentioned expression (2), y is ½ or 1 when K is 2 or more. For example, y=1 when the number of stator main poles is 12 and four coils for every phase are distributed at an interval of 90 degrees, while y=½ in another case.

The operation of the above-mentioned motor will be described with reference to FIG. 9, in the case of excitation steps in two-phase excitation by way of example.

Figures 9, 10:
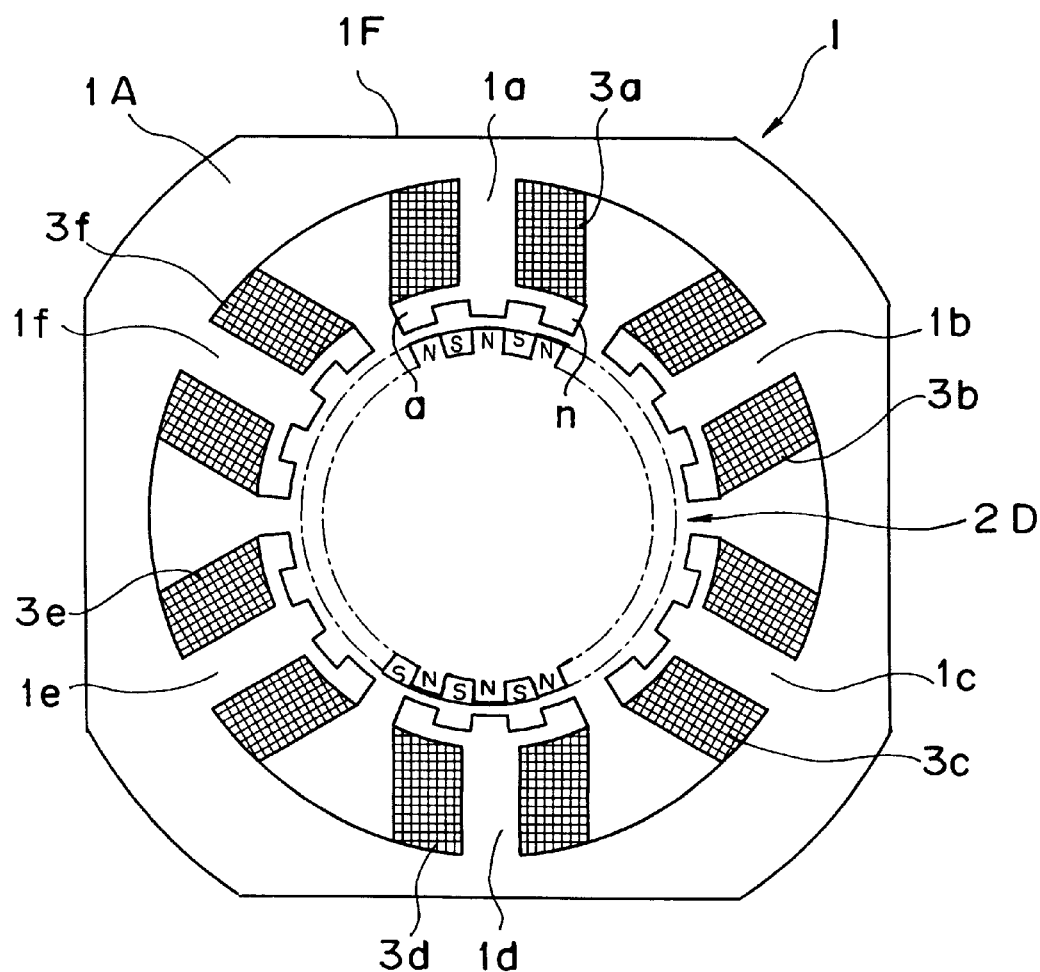
FIG. 9 is a table with respect to the driving steps in two-phase excitation for explaining the function of the first embodiment.
FIG. 10 is a vertically sectioned front view for explaining the basic functional configuration of a three-phase stepping motor for explaining a second embodiment based on the technical thought of the present invention.

In the table shown in FIG. 9, the column "step" expresses one cycle of excitation steps 1–5, while each row of every step shows magnetized polarity of respective main poles in accordance with an excitation electric current supplied to the main poles.

That is, when an electric current is supplied from the first-phase coil I to the second-phase coil II in the step 1, for example, the first stator main pole 1a and the second stator main pole 1b shown in FIG. 1 are excited into S poles, and the fourth stator main pole 1d and the fifth stator main pole 1e are excited into N poles. When an electric current is supplied from the third-phase coil III to the second-phase coil II in the step 2, the second stator main pole 1b and the third stator main pole 1c are excited into S poles, and the fifth stator main pole 1e and the sixth stator main pole 1f are excited into N poles.

Although the following steps are not described, the steps 1–5 shown in FIG. 9 are repeated so that the magnetic poles formed in the rotor are attracted by the above-mentioned rotating magnetic field to thereby make the rotor rotate continuously.

That is, in the above-mentioned circuit configuration, when the number Q of the main poles is set to be Q=6k (k=1 in this case), k N-poles and k S-poles are formed in 2k main poles for each phase at the time of excitation of each phase. It is understood that the motor rotates when the step 1 to the step 5 of the excitation steps are repeated in the motor having such a structure as shown in FIGS. 1 to 8. In addition, vibration with the rotation of the motor becomes low.

A hybrid motor is shown by way of example in the description of FIG. 8. Although a hybrid motor is apt to generate vibration, it is possible to reduce the vibration with the above-mentioned magnetic circuit configuration. In addition, although the above description is made about a star connection by way of example, it is a matter of course that a motor with a delta connection may operate in the same manner as described above so long as the motor is configured such that a suitable excitation electric current is supplied to the delta connection according to the above-mentioned technical description.

Second Embodiment

Next, referring to FIGS. 10 to 12, a second embodiment of the present invention will be described.

The basic configuration of the motor shown in FIG. 10 is the same as that in the first embodiment. In this embodiment, an induced magnetization rotor is used as its rotor by way of example. Therefore, in FIG. 10, main constituent elements the same as those in FIGS. 3 and 4 are referenced correspondingly, and detailed description thereof will be omitted here. The polarity of each magnetic pole shown in a rotor 2D designates those which appear on the rotor surface. In addition, as is apparent from FIG. 10, the polarities of the magnetic poles of the rotor which are in the positions opposite to the first and fourth main poles are different from those in the first embodiment illustrated in the drawings, in accordance with the conditions which will be described later.

The connection of coils 3a to 3f in this embodiment will be described with reference to FIG. 11. In FIG. 11, reference numerals 3a to 3f represent coils wound on stator main poles 1a to 1f respectively in the same manner as in FIG. 7. The fourth coil 3d is connected to the first coil 3a in the forward direction.

That is, for example, the winding start of the first coil 3a is led out as a terminal of a first-phase coil I, the winding end of the first coil 3a is connected to the winding start of the fourth coil 3d, and the winding end of the fourth coil 3d is connected to a common junction point o to which the winding end of the fifth coil 3e and the winding end of the sixth coil 3f are connected.

In the same manner, the fifth coil 3e is connected to the second coil 3b in the forward direction. The winding start of the second coil 3b is led out as a terminal of a second-phase coil II. The sixth coil 3f is connected to the third coil 3c in the forward direction. The winding start of the third coil 3c is led out as a terminal of a third-phase coil III.

That is, the motor of this structure constitutes a six-pole three-phase motor. The first coil 3a and the fourth coil 3d form a first-phase coil I. The second coil 3b and the fifth coil 3e form a second-phase coil II. The third coil 3c and the sixth coil 3f form a third-phase coil III.

As a result, for example, when an electric current is supplied to the first-phase coil I so as to excite the first stator main pole 1a into an S pole, all the pole teeth of the first stator main pole 1a become S poles, and at the same time, the fourth stator main pole 1d is excited into an S pole, so that all the pole teeth of the fourth stator main pole 1d become S poles.

That is, when an excitation electric current is supplied from the first-phase coil I to the second-phase coil II, the first stator main pole 1a and the fourth stator main pole 1d are excited into S poles, and the second stator main pole 1b and the fifth stator main pole 1e are excited into N poles. As a result, the rotor 2 is located in the position shown in FIG. 10, under the condition that excitation is effected only for one phase.

The number of permanent magnet pairs of the thus configured rotor of the second embodiment is set to satisfy the following expression (4) under the conditions satisfying the following expression (3).

$$Q=3m \quad (3)$$

$$Nr_3=ym(3n\pm1) \quad (4)$$

where Q designates the number of main poles; $Nr_3$, the number of S and N pole pairs of the rotor; m and n, integers not smaller than 1; and y, ½ or 1.

The operation of the above-mentioned motor will be described with reference to FIG. 12, in the case of excitation steps in two-phase excitation, by way of example.

Figures 11, 12:
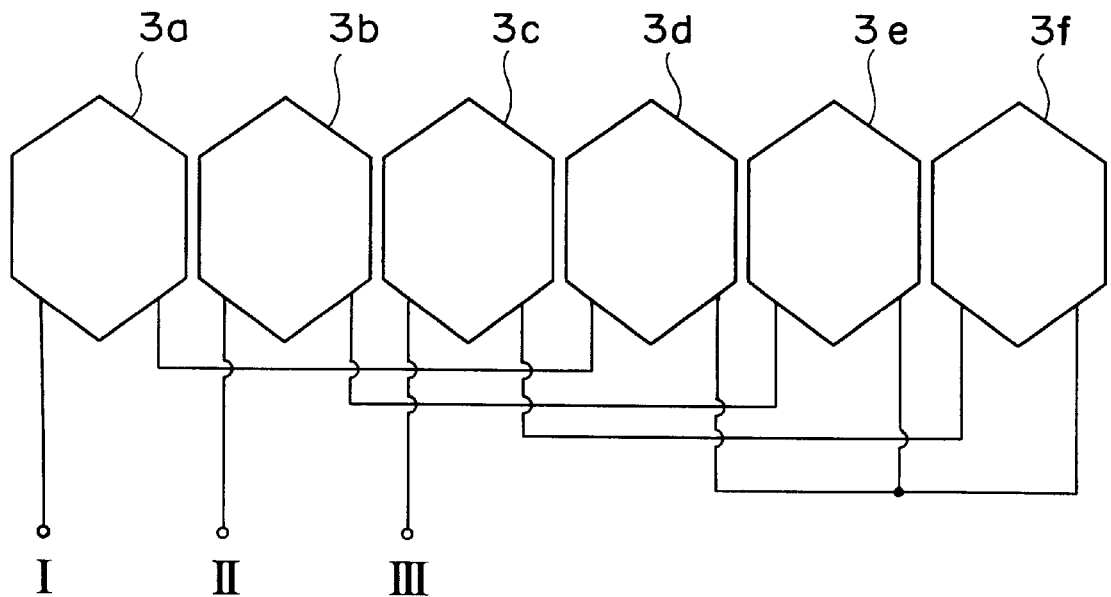
FIG. 11 is a schematic coil circuit diagram showing an example of connection of the coils in the second embodiment.
FIG. 12 is a table with respect to the driving steps in two-phase excitation for explaining the function of the second embodiment.

In the table shown in FIG. 12, the column "step" expresses one cycle of excitation steps 1–5, while each row of every step shows magnetized polarity of respective main poles in accordance with an excitation electric current supplied to the main poles.

That is, when an electric current is supplied from the first-phase coil I to the second-phase coil II in the step 1, the first stator main pole 1a and the fourth stator main pole 1d are excited into S poles, and the second stator main pole 1b and the fifth stator main pole 1e are excited into N poles.

Next, when an electric current is supplied from the third-phase coil III to the second-phase coil II in the step 2, the second stator main pole 1b and the fifth stator main pole 1e are excited into N poles, and the third stator main pole 1c and the sixth stator main pole 1f are excited into S poles.

Although the following steps are not described, the steps 1–5 shown in FIG. 12 are repeated so that the magnetic poles formed in the rotor are attracted by the above-mentioned rotating magnetic field to thereby make the rotor rotate continuously.

Although this embodiment is described about an induced magnetization rotor by way of example, it is matter of course that a permanent-magnet rotor or a hybrid rotor may operate in the same manner as described above. In addition, although the above description is about a star connection by way of example in the same manner in the first embodiment, not to say, the motor with a delta connection may operate in the same manner as mentioned above so long as the motor is configured such that a suitable excitation electric current is supplied to the delta connection according to the above-mentioned technical description.

According to the induced magnetization rotor described in this embodiment, a large number of teeth can be provided in the same manner as in a hybrid motor, as mentioned above, so that it is possible to obtain a high-resolution motor. In addition, in view of its structure, it is possible to obtain a motor having lower vibration than a hybrid motor in which N poles and S poles are separated from each other in the axial direction.

For example, under the condition which satisfies the above-mentioned expressions (3) and (4), Nr=50 when y=1, m=2, and n=8 so that a low-vibration motor having a step angle of 1.2 degrees can be obtained when Q=6.

Third Embodiment

Next, description will be made about a third embodiment which is particularly optimum for the above-mentioned hybrid motor, though it is applicable to the various types of motors described in the above-mentioned embodiments.

When the tooth width of the respective pole teeth of the stator described in the above-mentioned embodiments is designated by p, and the pitch of the respective pole teeth of the stator is designated by P, the values of p and P are set to satisfy the following expression (5) or (6).

$$p/P \approx 1/3 \quad (5)$$

$$[1-(\tfrac{2}{5})]/3 \leq p/P \leq [1+(\tfrac{2}{5})]/3 \quad (6)$$

Next, the reason why the expressions (5) and (6) are to be established will be explained.

For example, in FIG. 1, assume that the pole tooth width p of the stator is ½ of the pole tooth pitch P. Then, when the border between an N pole and an S pole of magnetic poles of the rotor comes to the center of the pole tooth width p, for example, the magnetic flux coming out from the N pole of the rotor passes only the pole tooth portion of the stator and goes to the adjacent S pole of the rotor without interlinking with any coil so as to increase ineffectual magnetic flux which does not contribute to torque.

This ineffectual magnetic flux is reduced, as the pole tooth width p is made narrower, so that effective magnetic flux increases. However, if the pole tooth width p is further reduced, the effective magnetic flux begins to decrease.

In addition, a harmonic component contained in the magnetic flux changes correspondingly to the ratio p/P. This harmonic component causes vibration in the motor. In the case of a hybrid motor, magnetic poles of a rotor are not arranged uniformly in the direction of the rotation shaft, so that vibration is apt to be produced.

That is, the vibration characteristic changes correspondingly to the ratio of the width of a pole tooth of the stator to the width of a valley adjacent thereto, that is, the ratio of the pole tooth width to the pole tooth pitch. In other words, an optimum value as a three-phase motor determined by both the torque and vibration exists in the ratio of the pole tooth width p to the pole tooth pitch P.

This optimum condition is obtained as shown in the above-mentioned expression (5).

Further, practically, it is obtained as shown in the expression (6).

Fourth Embodiment

Next, referring to FIG. 13, a fourth embodiment of the present invention relating to the shape of a stator iron core will be described. This embodiment is applicable to any one of the above-mentioned first to third embodiments.

Figure 13:
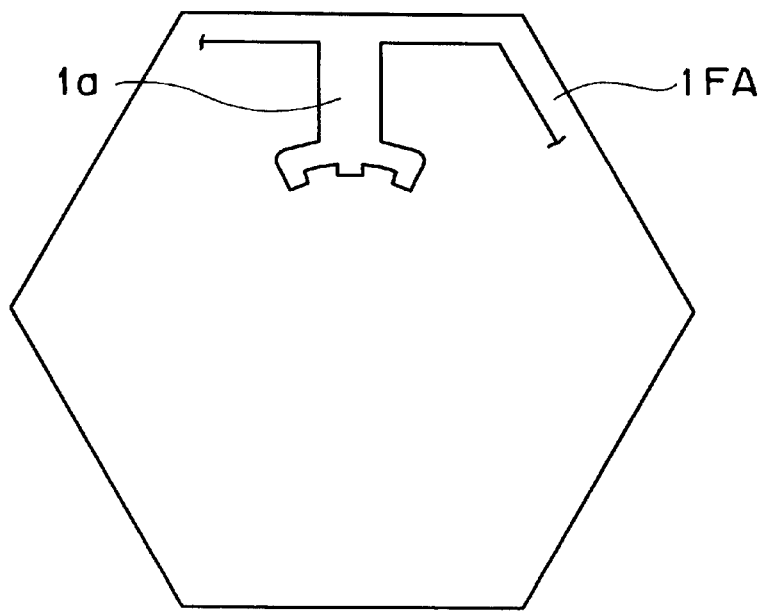
FIG. 13 is an explanatory view conceptually showing the outer shape of a stator iron core for explaining a fourth embodiment.

Only the region corresponding to the first main pole 1a and the yoke portion 1A connected thereto of the stator iron core 1F shown in FIG. 1 is shown in FIG. 13, and the rest portion is omitted.

While the connection portions of the respective main poles and the yoke portion 1A of the stator iron core shown in FIG. 1 are circular, the outer shape of a stator iron core 1FA shown in FIG. 13 is shaped into an equilaterally hexagonal and each of the main poles and a yoke portion are connected to each other at a right angle. Consequently, the coil occupation ratio is improved.

In a motor using the stator iron core shown in FIG. 13, because geometrical symmetry is established with respect to respective main poles, magnetic resistance becomes uniform and large torque can be obtained so as to reduce vibration. In addition, while the connection portions of the respective main poles and the yoke portion 1A of the stator iron core shown in FIG. 1 are circular, the connection portions of the main poles and the yoke portion are an equilateral hexagon, so that the coil occupation ratio is improved.

This embodiment is described about the hexagonal stator iron core shaped correspondingly to the case where the number of main poles is six. When the number of main poles is set to be more than six, it will go well if each of the main poles and a yoke portions adjacent to a main pole are connected to each other at a right angle symmetrically with respect to a main pole and the outer shape is formed into a suitable shape corresponding to its inner shape with reference to FIG. 13.

Fifth Embodiment

Next, referring to FIG. 14, a fifth embodiment of the present invention relating to the shape of a stator iron core will be described.

This embodiment is applicable to any one of the above-mentioned first to third embodiments.

Figure 14:
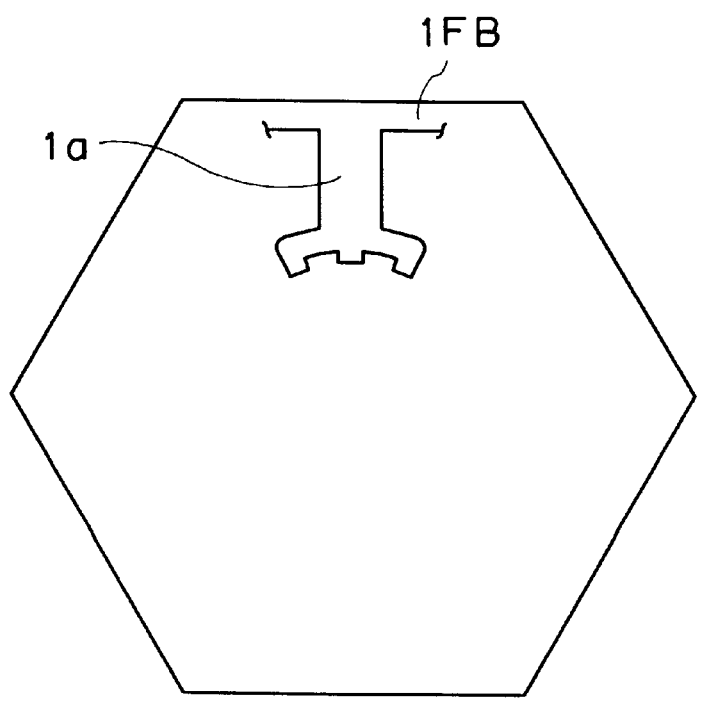
FIG. 14 is an explanatory view conceptually showing the outer shape of a stator iron core for explaining a fifth embodiment.

Although the outer shape of a stator iron core 1FB shown in FIG. 14 is formed into a hexagon in the same manner as in FIG. 13, the inner shape is formed into a circle in the same manner as in FIG. 1, so that the magnetic resistance is reduced.

Also in a motor using the stator iron core shown in FIG. 14, geometrical symmetry is established with respect to respective main poles, so that magnetic resistance becomes uniform and large torque can be obtained to thereby reduce vibration. This embodiment is described about the hexagonal stator iron core shaped correspondingly to the case where the number of main poles is six. When the number of main poles is more than six, it will go well if the stator iron core is formed so that geometrical symmetry is established with respect to the main poles respectively with reference to FIG. 14.

In addition, a stator having a practical structure in which magnetic resistance in stator magnetic poles is small can be obtained if the outer shape of the stator is formed substantially into a square including four sides of a square, and the shape of the yoke portion, on the rotor side, connecting the respective main poles of the stator is formed to be circular as shown in FIG. 1.

Sixth Embodiment

Figure 15:
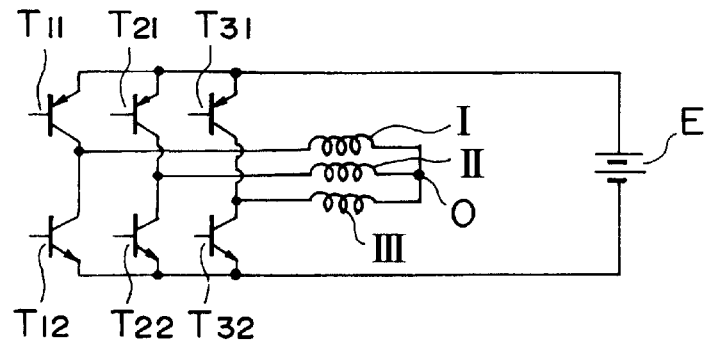
FIG. 15 is a schematic driving circuit diagram for explaining a sixth embodiment.

FIG. 15 shows a basic driving circuit which is a six embodiment of the present invention and which functions the present invention.

Figure 32:
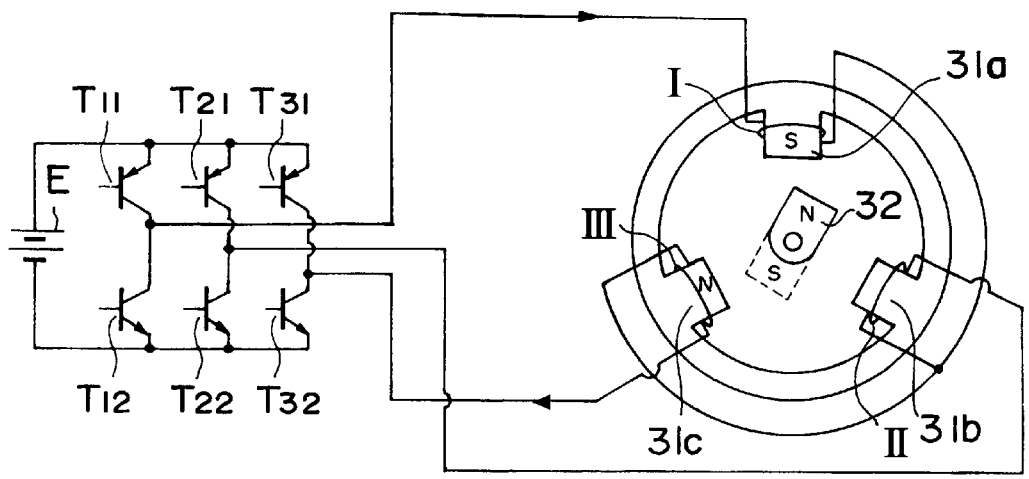
FIG. 32 is a schematic block diagram for explaining the function of a conventional three-phase stepping motor in the case of two-phase excitation in the two-phase/three-phase excitation.
Figure 33:
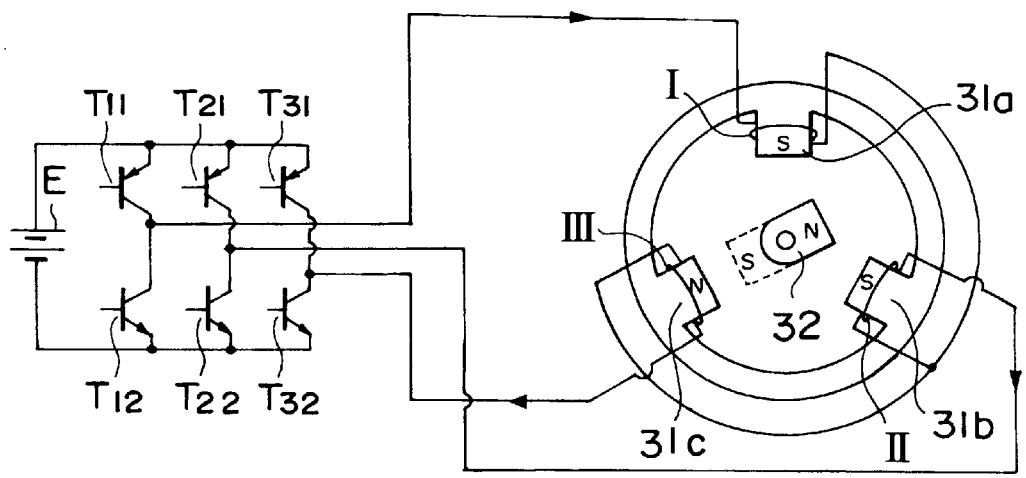
FIG. 33 is a schematic block diagram for explaining the function of the conventional three-phase stepping motor in the case of three-phase excitation in the two-phase/three-phase excitation.
Figure 34:
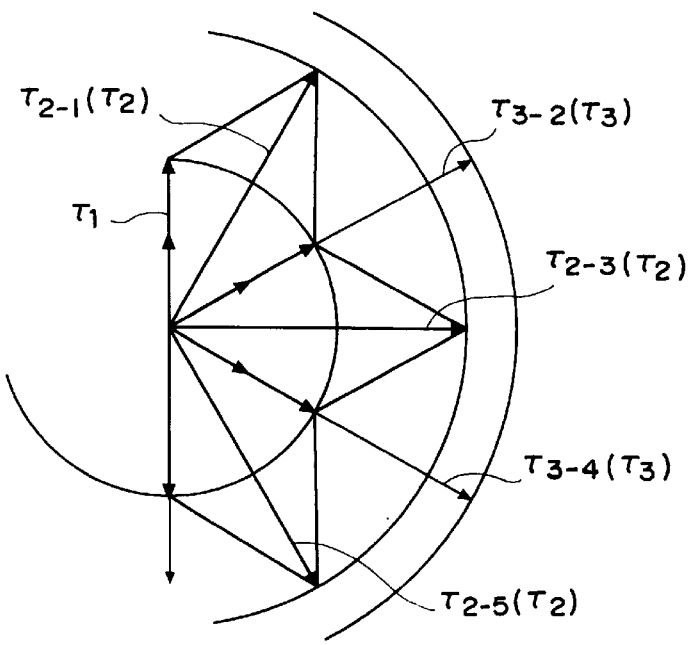
FIG. 34 is a vector diagram for explaining torque generated in the states of FIGS. 32 and 33.
Figure 35:
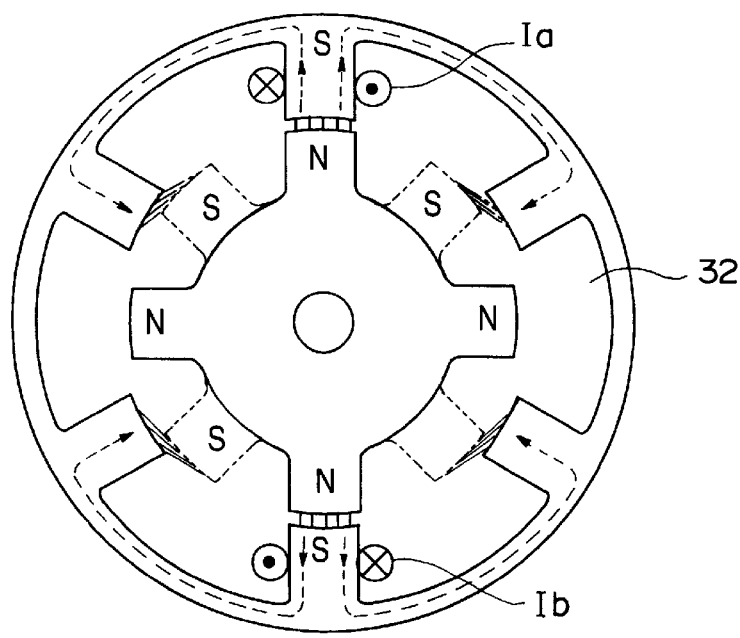
FIG. 35 is a vertically sectioned front view of a six-pole three-phase stepping motor showing problems in a magnetic circuit of a conventional three-phase stepping motor by way of example.

The driving circuit shown in FIG. 15 is equivalent to the driving circuit shown in FIGS. 32 and 33 which are described as a prior art.

That is, in FIG. 15, three series circuits of switching elements such a transistors, or the like, $T_{11}$ and $T_{12}$, $T_{21}$ and $T_{22}$, and $T_{31}$ and $T_{32}$, are connected in parallel with each other between the output terminals of a DC source voltage E. The junction points of the three series circuits are connected to three terminals connected to a coil I wound on a first main pole 31a (see FIG. 32), a coil II wound on a second main pole 31b, and a coil III wound on a third main pole 31c, respectively. The coils I, II and III are connected into a star-connection.

The control circuit for driving the respective switching elements may be constituted by various electronic parts available on the market, and/or a computer, etc. so as to realize the driving method of the present invention which will be described later. Therefore, the detailed description is omitted here.

Now, for example, when the switching elements $T_{11}$ and $T_{22}$ are turned on, an electric current flows from the first-phase coil I to the second-phase coil II. When the number Q of the stator main poles is Q=6k (k=1), the first stator main pole 1a and the second stator main pole 1b are excited into S poles, and the fourth stator main pole 1d and the fifth stator main pole 1e are excited into N poles, as shown in the first step described with reference to FIG. 9 in the first embodiment.

Thereafter, if the switching elements are selectively turned on such that an electric current flows into the respective coil terminals as shown in FIG. 9, the motor driving based on the two-phase excitation is executed.

Seventh Embodiment

Next, referring to FIG. 16, a driving circuit according to a seventh embodiment of the present invention will be described.

Figure 16:
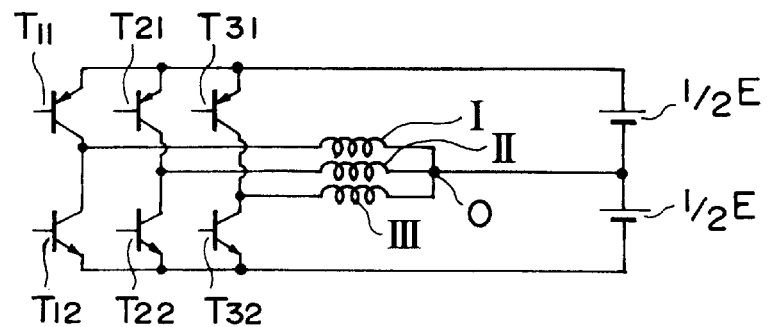
FIG. 16 is a schematic driving circuit diagram for explaining a seventh embodiment.

In FIG. 16, elements and functions the same as those in FIG. 15 are referenced correspondingly, and detailed description thereof will be omitted here.

In this embodiment, the DC source voltage is constituted by a pair of serially connected source voltages each of which is ½ of the source voltage E of FIG. 15, and the junction point o of the star-connection of the phase coils of the motor as a neutral portion is connected to the junction point of the DC source voltages (½)E.

In this embodiment, instead of providing the DC source voltages (½)E, the DC source voltage E may be divided by two resistors having equal predetermined values so that the junction point of the resistors is connected to the junction point o of the coils.

With the above-mentioned connection, the potential of the neutral portion is prevented from fluctuating due to the influence of the excitation electric current and motor characteristics.

Eighth Embodiment

Next, referring to FIG. 17, a driving circuit which can stabilize the potential of a neutral portion will be described as an eighth embodiment of the present invention.

Figure 17:
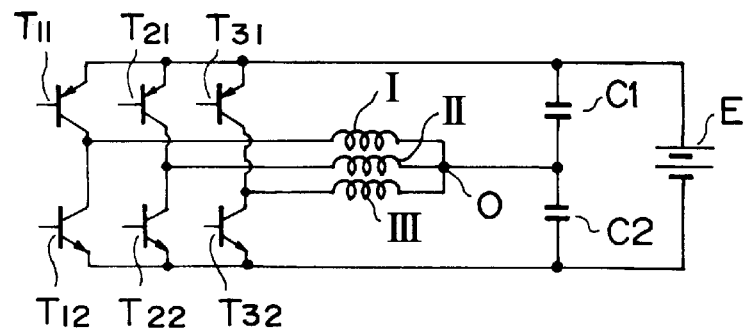
FIG. 17 is a schematic driving circuit diagram for explaining an eighth embodiment.

In FIG. 17, elements and functions the same as those in FIGS. 14 and 15 are referenced correspondingly, and detailed description thereof will be omitted here.

In this embodiment, two capacitors C1 and C2 the capacitance values of which are equal to each other are connected in series between the output terminals of a DC source voltage E. A junction point o as a neutral portion of the star-connected phase coils of the motor is connected to the junction point of the capacitors. With the above-mentioned connection, the potential of the neutral portion is prevented from transitionally fluctuating due to the influence of the excitation electric current and motor characteristics.

Ninth Embodiment

Next, referring to FIGS. 18 and 19, description will be made about a driving method based on two-phase/three-phase excitation, as a ninth embodiment of the present invention. This driving method is a basic driving method corresponding to the driving method in the second to eighth embodiments.

Figure 18:
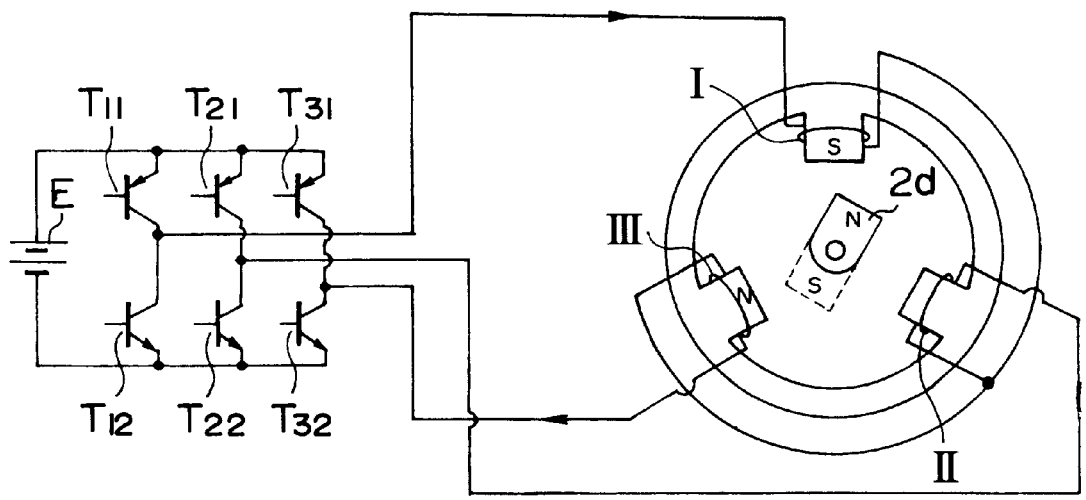
FIG. 18 is a conceptual circuit diagram for explaining the state of two-phase excitation in a ninth embodiment.
Figure 19:
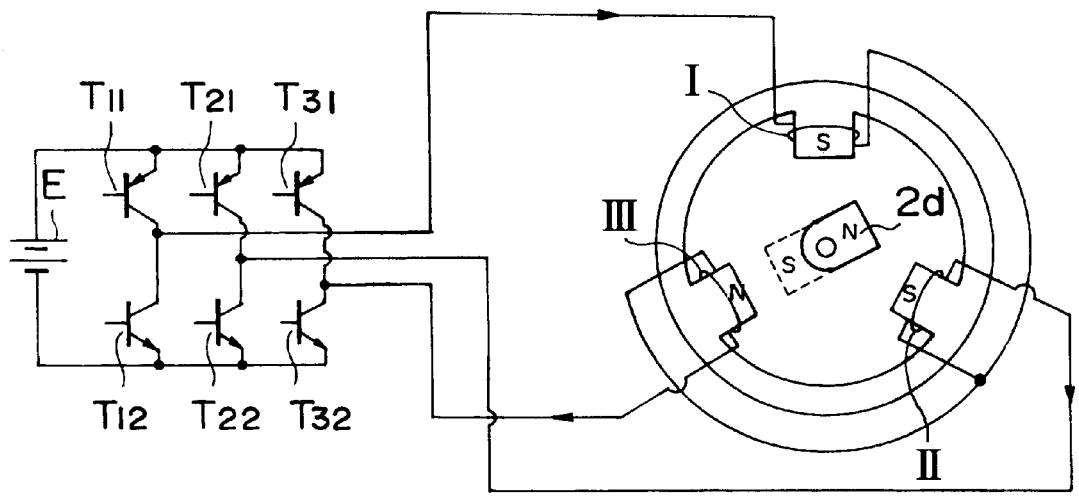
FIG. 19 is a conceptual circuit diagram for explaining the state of three-phase excitation in the ninth embodiment.

A general two-phase/three-phase excitation circuit for driving a three-phase stepping motor is executed as shown in FIGS. 18 and 19 which are modification of FIG. 15 showing the excitation circuit conceptually.

In FIGS. 18 and 19, a rotor is simplified and shown by two poles and a stator is simplified and shown by three poles, for convenience of description and comprehension, in the same manner as in FIG. 8. FIG. 18 shows an example of two-phase excitation, and FIG. 19 shows an example of three-phase excitation.

In the drawings, three series circuits of switching elements such as transistors, or the like, $T_{11}$ and $T_{12}$, $T_{21}$ and $T_{22}$, and $T_{31}$ and $T_{32}$, are connected in parallel with each other between the output terminals of a DC source voltage E. The respective junction points of the three series circuits of switching elements are connected to a coil of a first phase (hereinafter, referred to as coil I), a coil of a second phase (hereinafter, referred to as coil II), and a coil of a third phase (hereinafter, referred to as coil III), respectively. The coils I, II and III are connected into a star-connection.

In the circuit in FIG. 18, when the switching elements $T_{11}$ and $T_{32}$ are turned on to execute two-phase excitation, an electric current flows from the first-phase coil I to the third-phase coil III as shown by the arrow in FIG. 18. As a result, a main pole of the first phase is excited into an S pole, and a main pole of the third phase is excited into an N pole.

Accordingly, the N pole of a rotor 2d is attracted to the S pole formed in the first-phase main pole, and the S pole of the rotor 2d is attracted to the N pole formed in the third-phase main pole, so that the rotor 2d comes into the position shown in FIG. 18.

In the circuit in FIG. 19, when the switching elements $T_{11}$, $T_{22}$ and $T_{32}$ are turned on to execute three-phase excitation, an electric current flows from the first-phase coil I to the second-phase coil II and the third-phase coil III as shown by the arrow in FIG. 19. As a result, the main pole of the first phase and a main pole of the second phase are excited into S poles, and the main pole of the third phase is excited into an N pole. Accordingly, the N pole of the rotor 2d is attracted to the S poles formed in the first-phase and second-phase main poles, and the S pole of the rotor 2d is attracted to the N pole formed in the third-phase main pole, so that the rotor 2d comes into the position shown in FIG. 19.

In such a manner as mentioned above, thereafter, the six switching elements are turned on sequentially, so that the rotor 2d rotates clockwise continuously from the state shown in FIGS. 18 and 19.

FIG. 20 shows excitation steps in two-phase/three-phase excitation in the ninth embodiment in the case where m=2 in the six-pole motor shown in FIG. 10 which is used for description of the second embodiment, that is, in the case where the number of poles Q is Q=3m.

In FIG. 20, the column "step" expresses a first step to a twelfth step. After the twelfth step, the operation returns to the first step. That is, a thirteenth step is the same as first step.

The rows show the on/off states of the respective switching elements, and the excited polarities of the respective main poles corresponding to the on/off states.

Even if m is set to be larger than 2 in the number of poles Q=3m of the motor, the motor may be driven in accordance with the excitation steps of FIG. 20 and in accordance with the coil connection of the respective phases.

That is, the motor shown in the second embodiment and motors applicable to the respective embodiments described in the third embodiment et seq. are driven in accordance with the steps shown in FIG. 20.

Tenth Embodiment

Next, referring to FIG. 21, description will be made about a driving method based on two-phase/three-phase excitation according to a tenth embodiment of the present invention.

This embodiment is a basic driving method corresponding to the motor shown in the first embodiment, that is, the case of Q=6k, and the third to eighth embodiments.

FIG. 21 shows excitation steps of two-phase/three-phase excitation in the tenth embodiment. Also in FIG. 21, the column "step" shows steps 1 to 12 forming one cycle. After the step 12, the operation returns to the step 1. That is, the step 13 is identical with the step 1.

The rows show the on/off states of the switching elements, and the excited polarities of the main poles corresponding to the on/off states.

Even if k is set to be larger than 2 in the number of poles Q=6k of the motor, the motor may be driven in accordance with the excitation steps of FIG. 21 and in accordance with the coil connection method of the respective phases.

That is, the motor shown in the first embodiment and motors applicable to the respective embodiments described in the second embodiment et seq. are driven in accordance with the steps shown in FIG. 21.

Eleventh Embodiment

Next, referring to FIG. 22, description will be made about a constant-current driving method in two-phase/three-phase excitation according to an eleventh embodiment of the present invention.

Figure 22:
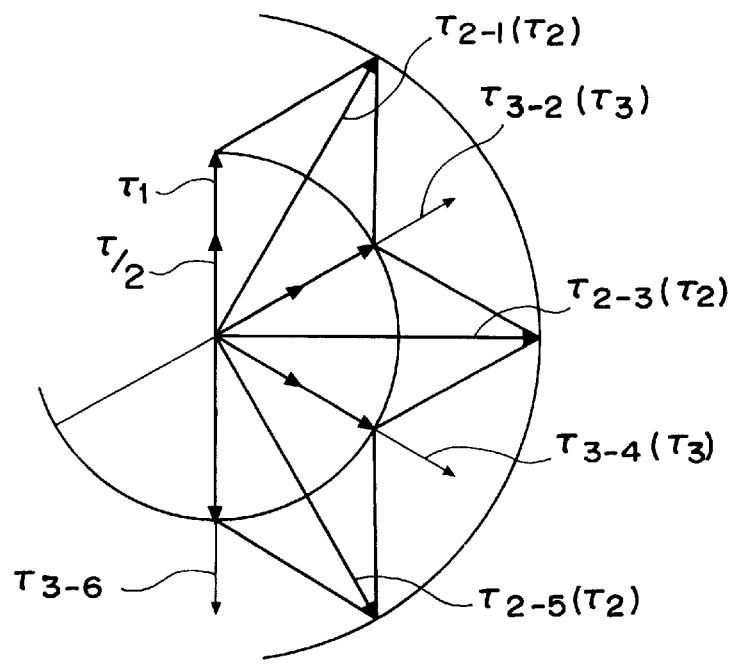
FIG. 22 is a vector diagram of torque for explaining an eleventh embodiment.

FIG. 22 is a vector diagram showing the torque characteristic generated by a motor corresponding to the circuit shown in FIGS. 18 and 19.

In FIG. 22, $\tau_1$ designates torque generated in a main pole having a coil wound thereon when an electric current is applied only to the coil as will be mentioned later, $\tau_{2-1}$, $\tau_{2-3}$ and $\tau_{2-5}$ designate vector sums of torque generated in the respective main poles in two-phase excitation, and $\tau_{3-2}$ and $\tau_{3-4}$ designate vector sums of torque generated in the respective main poles in three-phase excitation, correspondingly to the rotation of the motor.

The switching elements $T_{11}$ to $T_{32}$ are controlled by PWM (pulse width modulation) so that the electric current supplied in two-phase excitation and in three-phase excitation, that is, the value of the electric current supplied from the source voltage E shown in FIGS. 18 and 19 (hereinafter referred to as total electric current) becomes constant.

When the value of the total electric current is represented by J, an electric current having a value equal to J flows into the first-phase coil I and the third-phase coil III in two-phase excitation, as shown in FIG. 18.

In three-phase excitation, an electric current having a value equal to J/2 flows into the first-phase coil I and the second-phase coil II, and an electric current having a value equal to J flows into the third-phase coil III, as shown in FIG. 19.

Accordingly, as shown in FIG. 22, torque generated in one coil takes a value of $\tau_1$ in two-phase excitation. In three-phase excitation, if an electric current is halved, torque takes a value of $\tau_1/2$, which is ½ of a value in a conventional case.

In this case, $\tau_3 = \tau_1 + 2(\tau_1/2)\cos 60° = (3/2)\tau_1$.

Accordingly, the torque sum $_{\tau 2}$ in two-phase excitation is expressed by the following expression (7), and the torque sum $\tau_3$ in three-phase excitation is expressed by the following expression (8).

$$\tau_2 = \sqrt{\tau_1} \quad (7)$$

$$\tau_3 = (\tfrac{1}{2})\tau_1 \quad (8)$$

Accordingly, the torque $\tau_3$ in three-phase excitation is $1.5\tau_1$, which is smaller than the value of about $1.732\tau_1$ which is the torque $\tau_2$ in two-phase excitation. Then, the torque fluctuation ratio of the torque $\tau_2$ in two-phase excitation to the torque $\tau_3$ in three-phase excitation is 1.15.

Although the above description is made about an example in which the electric current supplied to an excitation circuit, that is, the total electric current in three-phase excitation is made ½ of that in two-phase excitation, the electric current supplied in three-phase excitation (the total current) may be set to a value suitable and controllable easily, for example, may be made larger than the above-mentioned value, that is, ½ of that in two-phase excitation, so that the torque $\tau_3$ in three-phase excitation is equal to the torque $\tau_2$ in two-phase excitation.

In this case, vibration of the motor can be more reduced so that the torque $\tau_3$ in three-phase excitation little changes from the torque $\tau_2$ in two-phase excitation.

Description was made in the case where Q=3 with reference to FIGS. 18 and 19, correspondingly to the ninth embodiment. However, also in the case where Q=6k, it is understood that it will go well if the total electric current value in two-phase excitation is made equal to that in three-phase excitation, and the total electric current in three-phase excitation is made suitably larger than that in two-phase excitation, by use of a torque vector diagram made up with reference to the above-mentioned description.

Twelfth Embodiment

Figure 23:
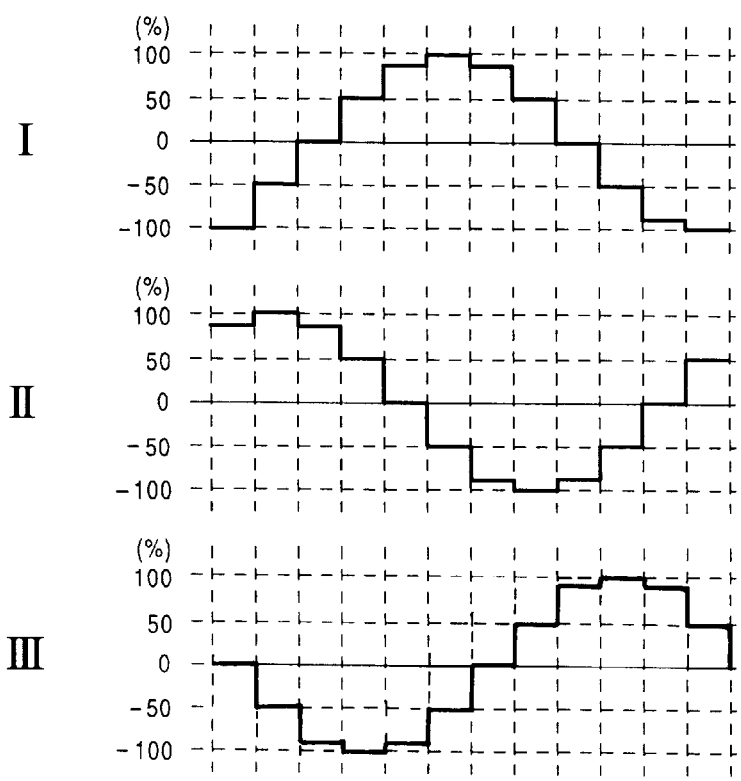
FIG. 23 is an electric current waveform diagram of respective phases for explaining a twelfth embodiment.

Referring to FIG. 23, a twelfth embodiment of the present invention will be described hereunder.

In this embodiment, the electric currents supplied to the respective phases from the respective switching elements in the circuit configuration diagrams shown in FIGS. 15 to 19 and so on are varied while the total sum of the electric currents flowing into the coils of the respective phases is always kept zero, as shown in FIG. 23.

In FIG. 23, the abscissa designates time, and the ordinate designates electric current values of the respective phases in the first-phase coil I, the second-phase coil II and the third-phase coil III in the descending order, with the rated electric current value regarded as ±100%. The motor is driven with the respective electric currents each having a waveform close to a sine wave in such a manner as shown in the drawing. As a result, a harmonic component included in the field magnetic flux density is reduced so as to reduce the vibration torque.

Although an example in which excitation electric currents are varied in 12 steps is shown in FIG. 23, other means for controlling excitation electric currents, such as micro-step driving based on suitable driving steps, may be adopted for driving while the total sum of the excitation electric currents of the respective phases are made equal in order to obtain the above-mentioned function. Voltage control may be also adopted.

Thirteenth Embodiment

Next, referring to FIGS. 24 to 28, description will be made about a driving method using an artificial two-phase/three-phase excitation mode, as a thirteenth embodiment of the present invention.

As for a driving circuit, diodes $D_{11}$, $D_{12}$, $D_{21}$, $D_{22}$, $D_{31}$, and $D_{32}$ are connected reverse-parallelly with the switching elements $T_{11}$ to $T_{32}$ respectively. That is, for example, a circulating circuit is constituted by the switching element $T_{11}$ and the diode $D_{11}$. In such a manner, each of the diodes is connected to a corresponding switching element to form a circulating circuit.

Figure 25:
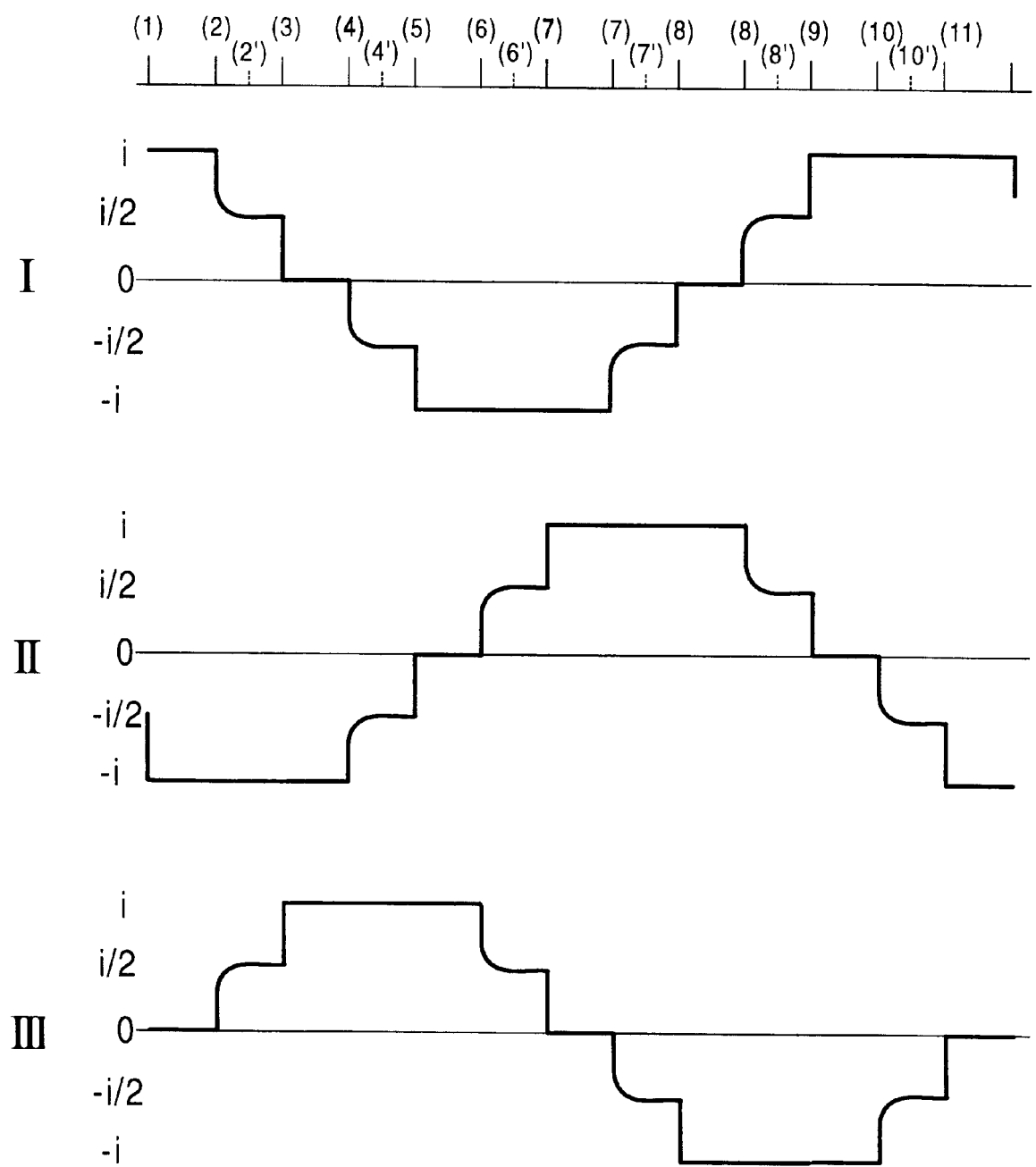
FIG. 25 is a schematic diagram of the excitation electric current waveforms of the respective phases for explaining the thirteenth embodiment.
Figure 26:
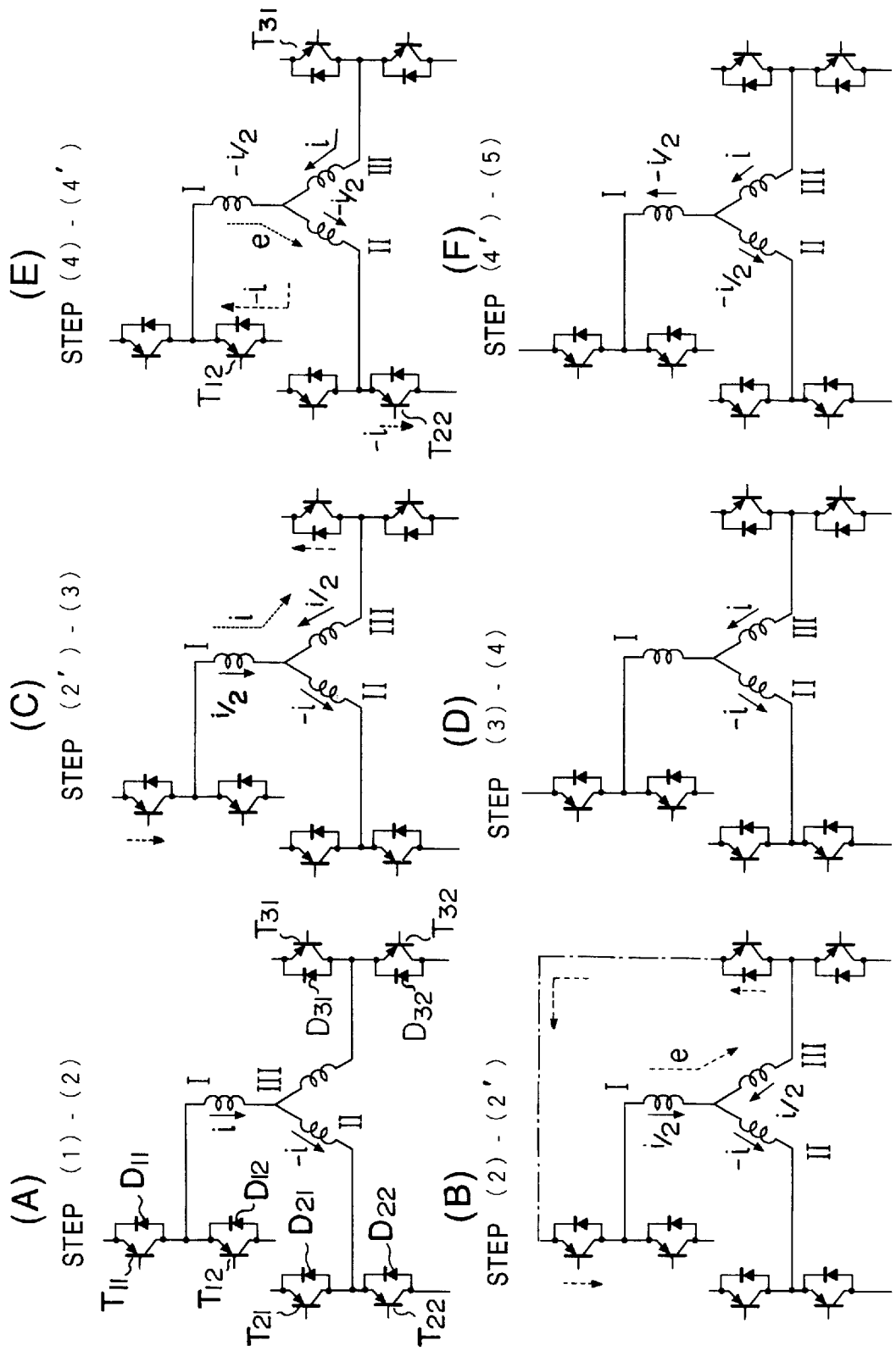
FIG. 26 shows explanatory diagrams (A)–(F) of the respective phase currents in the driving steps for explaining the thirteenth embodiment.
Figure 27:
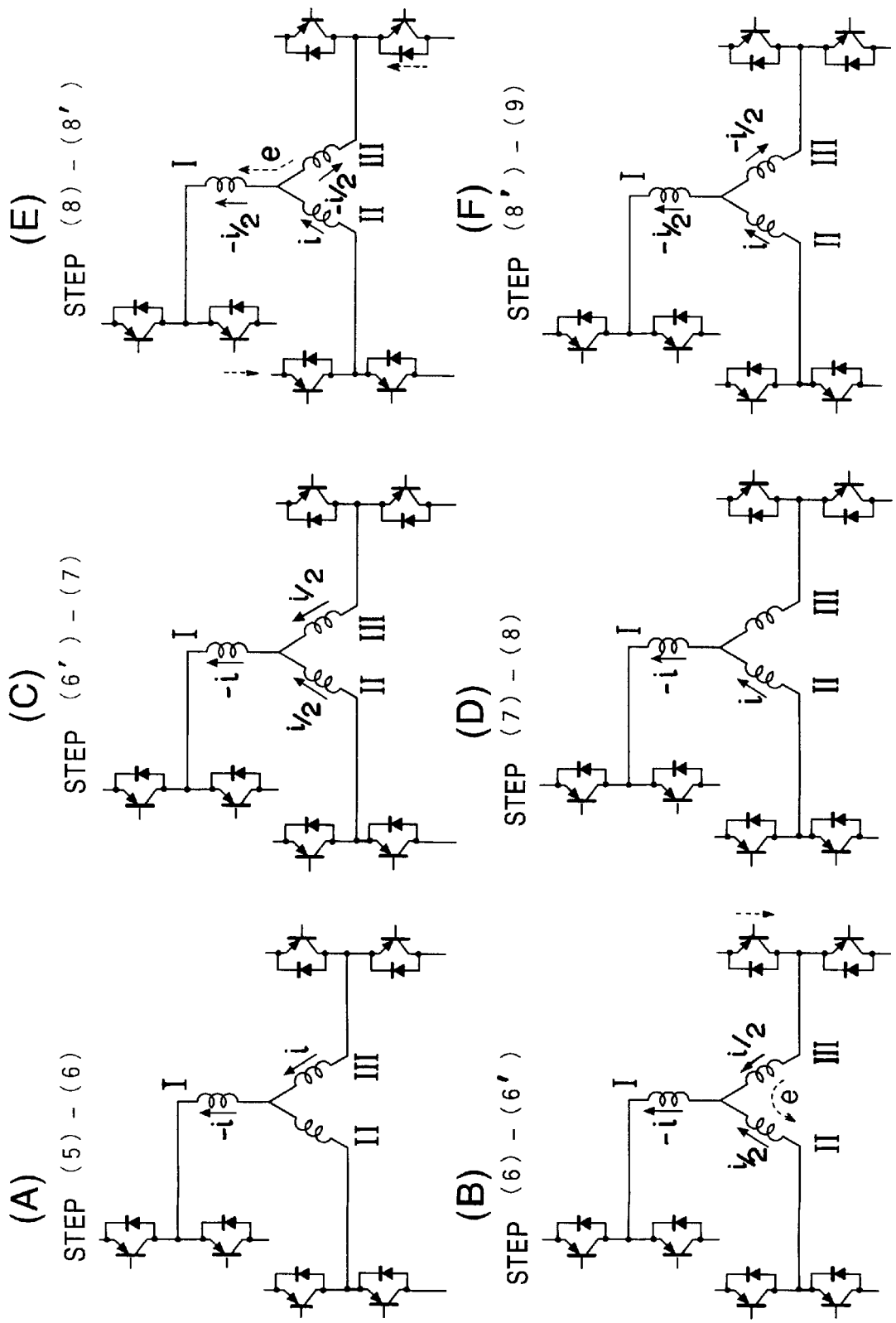
FIG. 27 shows explanatory diagrams (A)–(F) of the respective phase currents in the driving steps following the driving steps shown in FIG. 26, for explaining the thirteenth embodiment.
Figure 28:
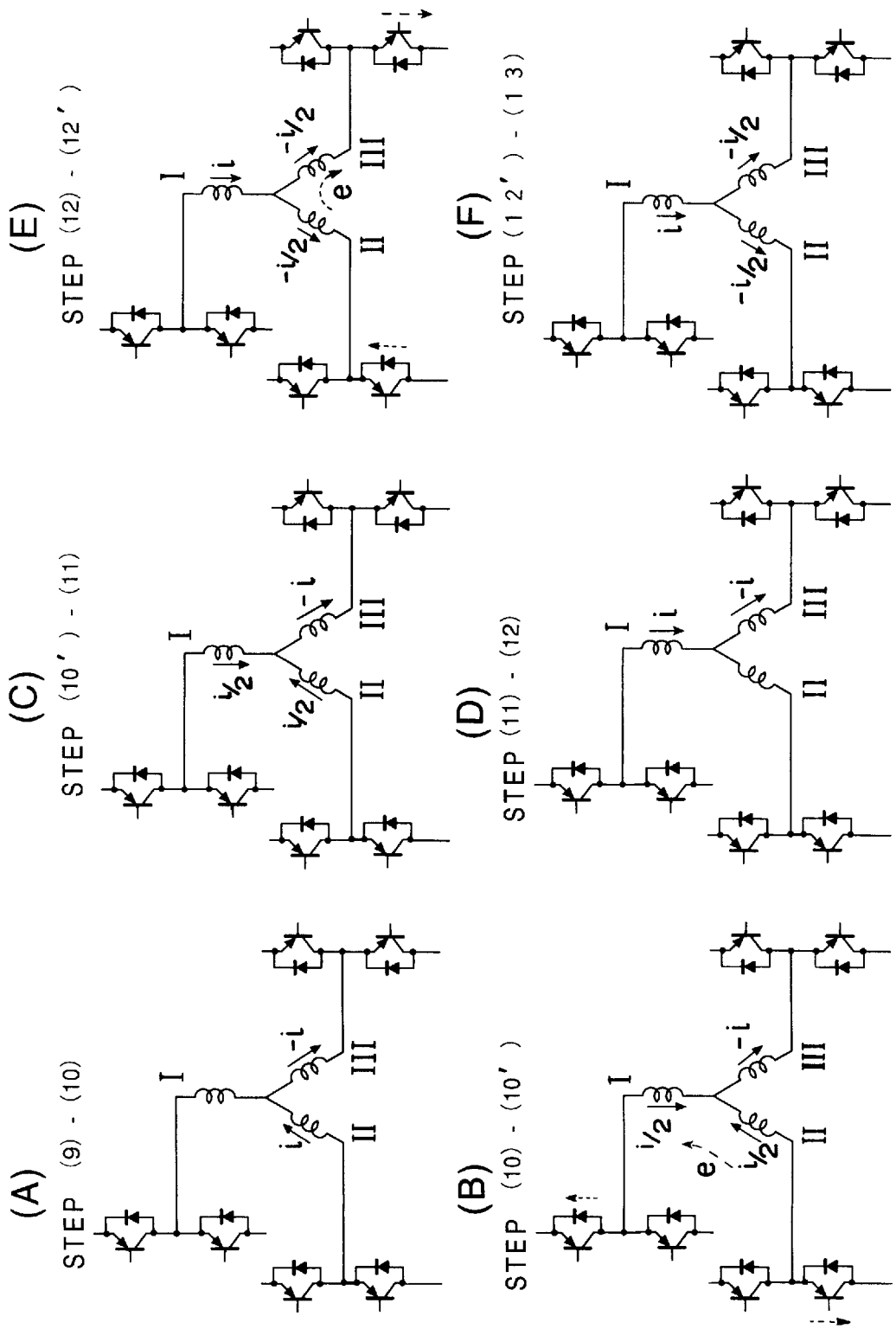
FIG. 28 shows explanatory diagrams (A)–(F) of the respective phase currents in the driving steps following the driving steps shown in FIG. 27, for explaining the thirteenth embodiment.

FIG. 24 shows steps of control of the driving switching elements in excitation steps. The diagrams (A) to (F) of FIG. 26 and the diagrams (A) to (F) of FIG. 28 show the electric current flowing states of the coils of the respective phases in the respective excitation steps shown in FIG. 24. FIG. 25 shows electric current waveforms flowing in the coils of the respective phases.

The respective reference numerals in FIGS. 24 to 28 designate those in FIGS. 15 to 19 correspondingly, except the diodes. In addition, I, II and III designate the coils of the respective phases.

As shown in the first step (1)–(2) in FIG. 24, if the first switching elements $T_{11}$ of the first-phase coil I and the second switching elements $T_{22}$ of the second-phase coil II are turned on, an electric current i flows into the first-phase coil I, and an electric current –i flows out of the second-phase coil II, as shown by the arrow in FIG. 26(A).

That is, an electric current flows as shown in the section from the point (1) to the point (2) in FIG. 25.

In FIG. 25, an electric current flowing into the first-phase coil I, an electric current flowing into the second-phase coil II, and an electric current flowing into the third-phase coil III are shown respectively in the descending order. Above the level of 0, a rated electric current flowing into a coil is designated as i, and an electric current half as large as the rated electric current is shown as i/2. Below the level of 0, a rated electric current flowing out of a coil is designated as –i, and an electric current half as large as the rated electric current is shown as –i/2.

Next, as shown in the second step (2)-(2') of FIG. 24, if the first switching element $T_{31}$ of the third-phase coil III is also turned on in addition to the first switching element $T_{11}$ of the first-phase coil I and the second switching element $T_{22}$ of the second-phase coil II, an electric current i/2 flows into the first-phase coil I and the third-phase coil III respectively, and an electric current –i flows out of the second-phase coil II, as shown by the arrow in FIG. 26(B).

That is, though the electric current flowing in the second-phase coil II is not varied, the electric current flowing in the first-phase coil I and the electric current flowing in the third-phase coil III are varied suddenly by i/2. Consequently, electromotive force e shown by the dotted arrow is generated by transient electromagnetic induction, so that a transient circulating electric current shown by the dotted line flows in superposition on the above-mentioned normal electric current through the first diode $D_{31}$ of the third phase.

Therefore, as shown in the section from the point (2) to the point (2') in FIG. 25, though the electric current of the first phase varies gradually from i to i/2, the electric current of the second phase does not vary, and the electric current of the third phase varies gradually from 0 to i/2.

In the third step (2')–(3), when the electric current accompanying such a transient phenomenon disappears even if the driving of the respective switching elements is continued from the preceeding step, the circulating electric current disappears in FIG. 26(C). Then, as shown in the section from the point (2') to the point (3) in FIG. 25, an electric current of i/2 which is half as large as the rated electric current flows into each of the first-phase coil I and the third-phase coil III, while the rated electric current –i flows into the second-phase coil II.

Next, as shown in the fourth step (3)–(4) in FIG. 24, when the first switching element $T_{31}$ of the third-phase coil III and the second switching element $T_{22}$ of the second-phase coil II are turned on, an electric current i flows into the third-phase coil III, and an electric current –i flows into the second-phase coil II with no influence of the transient phenomenon, as shown in FIG. 26(D) and the section from the point (3) to the point (4) in FIG. 25.

Next, as shown in the fifth step (4)-(4') in FIG. 24, when the second switching element $T_{12}$ of the first-phase coil I is turned on in addition to the state of the fourth step, an electric current i flows out of the first switching element $T_{31}$ of the third-phase coil III, and an electric currents –i flow out of the second switching element $T_{12}$ of the first-phase coil I and the second switching element $T_{22}$ of the second-phase coil II, as shown in FIG. 26(E).

Also in this case, electromotive force e shown by the dotted arrow is generated by the transient phenomenon in the same manner as in the second step, so that an electric current shown by the dotted line flows in superimposition. Accordingly, as shown in the section from the point (4) to the point (4') in FIG. 25, the electric currents flowing in the first-phase coil I and the second-phase coil II vary gradually.

The following steps are obvious from FIGS. 24 to 28 with reference to the above-mentioned description. Therefore, description about the following steps is omitted.

At the beginning of three-phase excitation, a damping effect is generated by a circulating electric current caused by the above-mentioned transient phenomenon. Accordingly, a settling time is improved on a large scale in comparison with that in two-phase excitation.

Although the diodes are connected reverse-parallelly with the respective switching elements in the above description, it is not necessary to connect such diodes in a case of using switching elements with which diodes each having a suitable performance are coupled in advance.

Fourteenth Embodiment

Next, referring to FIG. 29, a fourteenth embodiment of the present invention in which the above-mentioned respective driving methods are applied to a three-phase distribution type claw-pole motor (stepping motor) will be described.

Figure 29:
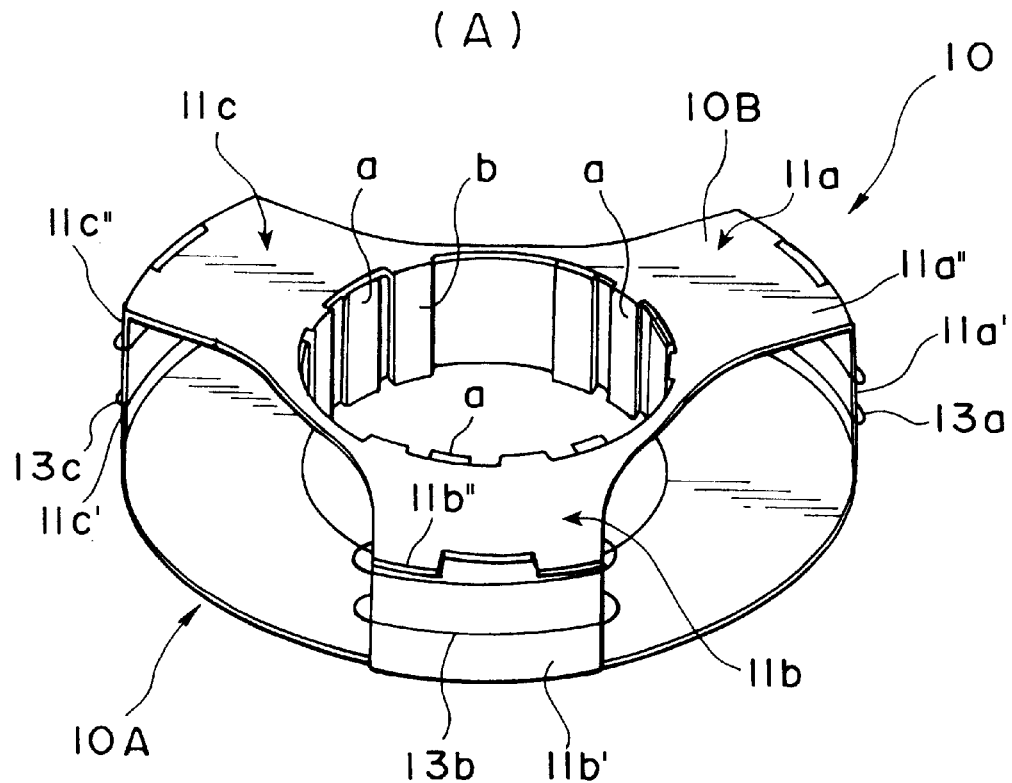
FIG. 29 is a view for explaining a structure of a three-phase distribution claw-pole type permanent-magnet stepping motor for explaining a fourteenth embodiment, in which (A) is a perspective view of a stator, and (B) is a perspective view of a rotor.
Figure 29:
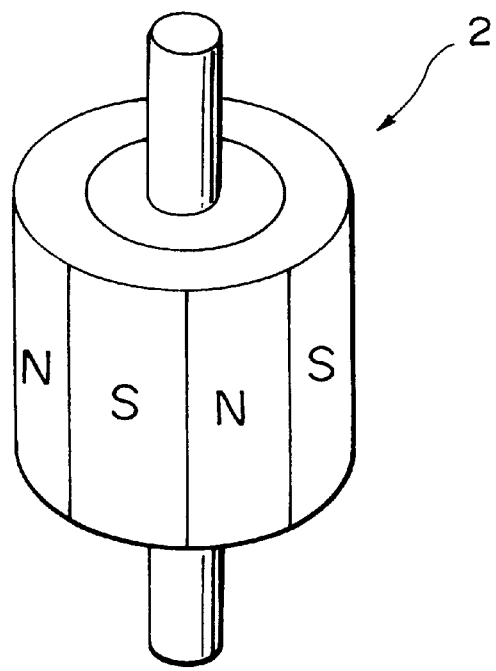

In FIG. 29, the reference numeral 10 represents a stator; and 2, a rotor having S and N poles magnetized cylindrically and being supported rotatably. In the stator 10, shown (A) of FIG. 29, three main pole portions 11a', 11b' and 11c' each of which is provided with a predetermined number of claw poles a are formed in a first magnetic plate 10A at a predetermined pitch. In addition, three main pole portions 11a", 11b" and 11c" each of which is provided with claw poles b formed correspondingly to the claw poles a provided in the first magnetic plate 10A are formed in a second magnetic plate 10B. The first magnetic plate 10A and the second magnetic plate 10B are coupled with each other at the main pole portions 11a', 11b' and 11c', and 11a", 11b" and 11c" respectively to form main poles 11a, 11b and 11c so that the claw poles a and b gear with each other through a predetermined gap.

In addition, coils 13a, 13b and 13c are wound on the three main poles 11a, 11b and 11c respectively.

Since the number Nr of claw pole pairs gearing with each other in this structure satisfies the following expression (9), the detailed description of which is omitted, and any driving method described in the above-mentioned tenth to fourteenth embodiments is applicable to a motor having this structure.

$$Nr=m(3n\pm1) \quad (9)$$

In the expression (9), m is an integer not smaller than 1, which is corresponding to the condition of Q=3m, in which Q represents the number of poles, and n is also an integer not smaller than 1.

Fifteenth Embodiment

The present invention is applicable to a three-phase cascade type claw-pole motor (stepping motor), in the same manner as in the case where it is applied to the above-mentioned three-phase distribution type claw-pole motor.

When winding starts and ends of three coils are suitably arranged into three terminals (the winding ends are connected to each other to form a star-connection, or a winding start to one coil is connected to a winding end of another coil sequentially to form a delta-connection), two-phase/three-phase excitation or artificial two-phase/three-phase excitation can be realized in the same manner.

Figure 30:
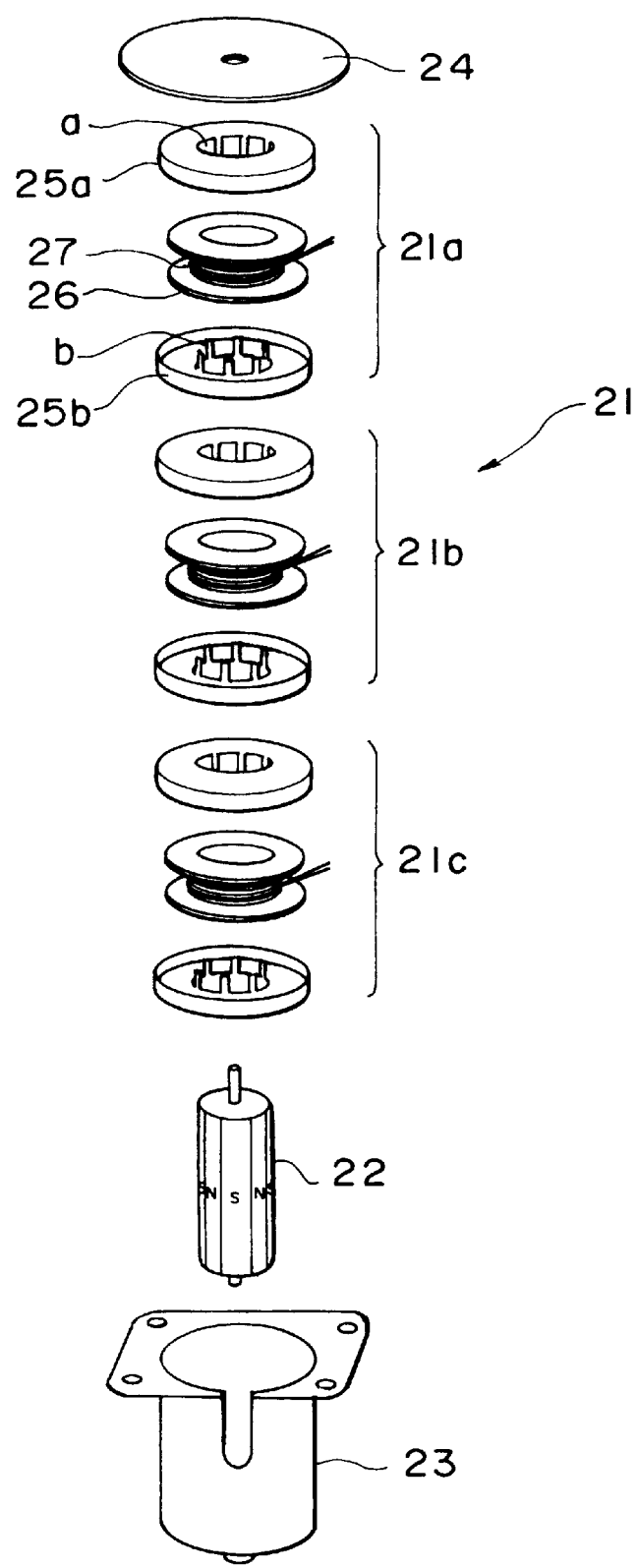
FIG. 30 is an exploded assembling view for explaining the structure of a three-phase cascade claw-pole type permanent-magnet stepping motor for explaining a fifteenth embodiment.

FIG. 30 is an exploded assembling diagram of a three-phase cascade type claw-pole motor, which is a fifteenth embodiment of the present invention.

FIG. 30 shows various constituent parts of the exploded motor in perspective view, excluding bearing members and assembling/fitting members.

In FIG. 30, the reference numeral 21 represents a stator, in which three single-phase stators 21a to 21c are laid on top of each other. A rotor 22 in which N and S poles of permanent magnets are magnetized alternately at a predetermined pitch is provided rotatably in the center portion of the stator 21.

Each of the three single-phase stators 21a to 21c has a first yoke element 25a provided with claw poles a at a pitch which is twice as large as the pitch of the N and S poles formed in the rotor 22 and second yoke element 25b provided with claw poles b at the same pitch as the claw poles a. The yoke elements 25a and 25b are disposed so as to have a predetermined gap from the surface of the rotor 22, and so as to make the claw poles a and b are in opposition to each other at an equal distance. In each single-phase stator, between the above-mentioned pair of yoke elements 25a and 25b, a coil 27 is wound on a ring-like coil bobbin 26.

The reference numeral 23 represents a housing; and 24, an assembling member.

When the above-mentioned three single-phase stators are displaced by rotating by 60/Nr degrees or 120/Nr degrees successively in the circumferential direction, any one of the driving methods described in the ninth to thirteenth embodiments can be applied to the motor structured according to this embodiment.

In this case, instead of making the respective single-phase stators displace by rotating by 60/Nr degrees or 120/Nr degrees successively in the circumferential direction, the magnetic poles of the rotor in positions opposite to the respective single-phase stators may be displaced by rotating by 60/Nr degrees or 120/Nr degrees succeedingly, while the respective single-phase stators may be fixed in one and the same positions.

Although either the stator or the rotor is disposed usually with above displacement by 60/Nr degrees rotation in the above-mentioned three-phase cascade type claw-pole motor, it is equivalent to the case of displacement by 120/Nr degrees rotation if one of the three coils is connected reversely.

Although specific conditions are shown as embodiments in the above description of the respective embodiments, it is a matter of course that other configurations of three-phase stepping motor not shown in the above description, or driving methods corresponding to the configurations can be executed by other conditions or combinations not shown in the above description if the above-mentioned various techniques are referred to.

Figure 31:
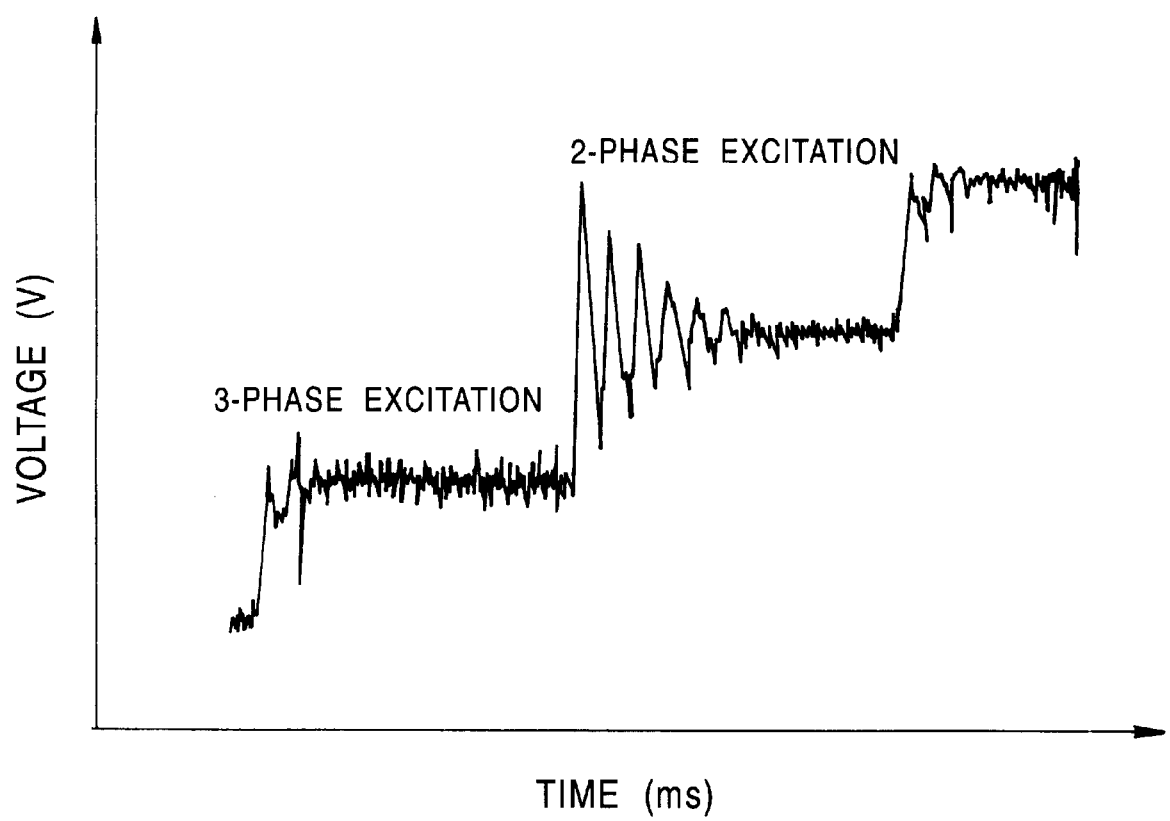
FIG. 31 is a diagram showing damping characteristic of a three-phase stepping motor to which the present invention is applied.

According to the present invention, rotation of a three-phase stepping motor becomes so smoothly that the damping property can be improved as mentioned above. An example thereof is shown in FIG. 31.

A three-phase stepping motor according to the present invention is configured and driven as mentioned above, so that it has superior effects as follows.

(1) According to the magnetic path system stated in claim 1, magnetic paths exclusive for respective main poles are formed independently of other main poles having no relation with the magnetic paths. the motor is hardly subjected to an influence of a change in an electric current or a change in magnetic flux of other phases.

(2) In the above-mentioned case (1), since the motor is hardly subjected to an influence of other phases, so that the motor is advantageously stable and low in vibration. Particularly, an effect of low vibration is large in the case of a hybrid rotor.

(3) When a hybrid rotor or an induced magnetization rotor is used, it is possible to obtain high resolution.

(4) When high resolution is obtained, it is possible to make vibration lower in the case of using an induced magnetization rotor than in the case of using a hybrid rotor.

(5) It is possible to make an electric current constant up to a higher-frequency pulse area by constant-current driving than by constant-voltage driving so that desirable torque is obtained up to a high-speed area.

(6) When values of electric currents (total electric currents) supplied in two-phase excitation and in three-phase excitation are made equal, it is possible to form a driving function at low cost.

(7) When diodes are connected in parallel with switching elements for driving a stepping motor so as to add an artificial three-phase excitation mode to a two-phase/three-phase excitation system, as shown in the thirteenth embodiment, it is possible to reduce settling time and to obtain superior-damping driving by a low-cost means.

(8) When the potential at a neutral point of star connection is connected to an intermediate potential portion of a power source directly or through a capacitor or the like, the potential is stabilized so that low-vibration driving can be realized.

(9) When the outer shape of the motor is made to be a square or a square having curved corners, the motor does not occupy a larger space than a motor the outer shape of which is made to be a circle. In addition, advantageously, no spending excessive cost is required when a stator iron core is formed by punching out a silicon steel plate, and the motor is lowered in vibration and increased in mechanical strength.

(10) When the outer shape of the motor is made to be a square or a square having curved corners, the sectional area of a magnetic circuit can be made larger than that in the case where the motor circuit has a circular outer shape. Accordingly, it is possible to reduce the magnetic resistance.

(11) When main poles are made parallel with the center axes, and portions coupled with a yoke portion are made at a right angle as shown in FIGS. 13 and 14, so as to make the inner shape of the yoke portion is approximated to an equilateral hexagon, it is possible to improve the coil occupation rate.

(12) When the outer shape of the motor is made to be a square or a hexagon and the inner shape of the yoke is made circular, it is possible to reduce the magnetic resistance.

(13) When the total sum of excitation electric currents to the respective coils is made constant while the values of the respective electric currents are varied, a harmonic component included in field magnetic flux density is reduced by means such as driving with a waveform close to a sine wave to thereby reduce vibration torque.

(14) Since an excitation method according to the present invention is applicable also to a claw-pole stepping motor, it is possible to utilize advantages of a claw-pole stepping motor of either a distribution type or a cascade type.

What is claimed is:

1. A three-phase stepping motor comprising:

a rotation shaft rotatably supported by a pair of bearings provided in predetermined places of a housing so as to be in opposition to each other;

a permanent-magnet rotor formed in a cylindrical shape so as to have south (S) and north (N) poles magnetized alternately in the direction of rotation on an outer circumferential portion of said rotor, or an induced magnetization rotor having S and N poles disposed alternately in the direction of rotation which are formed in a manner so that permanent magnets with the same polarity are fitted or formed so as to be identical in polarity at their surfaces in grooves formed parallelly to each other at a regular pitch in a surface of a magnetic body formed to be cylindrical in parallel to said rotation shaft and said cylindrical magnetic body is subjected to induced magnetization to form said S and N poles alternately in the surface of said cylindrical magnetic body, or a hybrid rotor constituted by two magnetic disks disposed on said rotation shaft perpendicularly thereto and a permanent magnet magnetized in the direction of rotation axis and held between said two magnetic disks, each of said two magnetic disks having pole teeth formed at a predetermined pitch at edge portions thereof, said two magnetic disks being displaced from each other in the direction of rotation by ½ of said predetermined; and a stator disposed so as to be in opposition to a surface of one of said rotors through a gap of a predetermined size, said stator having main poles the number of which is a multiple of 3, each of said main pole having a predetermined number of pole teeth and having a stator coil mounted thereon;

wherein the following conditions are satisfied:
(a) the number Q of said main poles is Q=6k, and k N-poles and k S-poles are formed in 2k main poles for each phase at the time of excitation of each phase, where k is an integer not smaller than 1;
(b) the number $Nr_6$ of S and N pole pairs of said rotor is set to be $Nr_6=yk(6n\pm1)$, where n is an integer not smaller than 1 and y is ½ or 1; and
(c) said stator coils are formed with three excitation feeding terminals of a star or delta connection.

2. A three-phase stepping motor comprising:

a rotation shaft rotatably supported by a pair of bearings provided in predetermined places of a housing so as to be in opposition to each other;

a permanent-magnet rotor formed in a cylindrical shape so as to have south (S) and north (N) poles magnetized alternately in the direction of rotation on an outer circumferential portion of said rotor, or an induced magnetization rotor having S and N poles disposed alternately in the direction of rotation which are formed in a manner so that permanent magnets with the same polarity are fitted or formed so as to be identical in polarity at their surfaces in grooves formed parallelly to each other at a regular pitch in a surface of a magnetic body formed to be cylindrical in parallel to said rotation shaft and said cylindrical magnetic body is subjected to induced magnetization to form said S and N poles alternately in the surface of said cylindrical magnetic body, or a hybrid rotor constituted by two magnetic disks disposed on said rotation shaft perpendicularly thereto and a permanent magnet magnetized in the direction of rotation axis and held between said two magnetic disks, each of said two magnetic disks having pole teeth formed at a predetermined pitch at edge portions thereof, said two magnetic disks being displaced from each other in the direction of rotation by ½ of said predetermined; and a stator disposed so as to be in opposition to a surface of one of said rotors through a gap of a predetermined size, said stator having at least three main poles, each of said main pole having a predetermined number of pole teeth and having a stator coil mounted thereon;

wherein the following conditions are satisfied:
(a) the number Q of said main poles is Q=3m;
(b) said stator coils are formed with three excitation feeding terminals of a star or delta connection; and
(c) the number $Nr_3$ of S and N pole pairs of said rotor is set to be $Nr_3=ym(3n\pm1)$, wherein each of m and n is an integer not smaller than 1, and y is ½ or 1.

3. A three-phase stepping motor comprising:

a rotation shaft rotatably supported by a pair of bearings provided in predetermined places of a housing so as to be in opposition to each other;

a permanent-magnet rotor formed in a cylindrical shape so as to have south (S) and north (N) poles magnetized alternately in the direction of rotation on an outer circumferential portion of said rotor, or an induced magnetization rotor having S and N poles disposed alternately in the direction of rotation which are formed in a manner so that permanent magnets with the same polarity are fitted or formed so as to be identical in polarity at their surfaces in grooves formed parallelly to each other at a regular pitch in a surface of a magnetic body formed to be cylindrical in parallel to said rotation shaft and said cylindrical magnetic body is subjected to induced magnetization to form said S and N poles alternately in the surface of said cylindrical magnetic body, or a hybrid rotor constituted by two magnetic disks disposed on said rotation shaft perpendicularly thereto and a permanent magnet magnetized in the direction of rotation axis and held between said two magnetic disks, each of said two magnetic disks having pole teeth formed at a predetermined pitch at edge portions thereof, said two magnetic disks being displaced from each other in the direction of rotation by ½ of said predetermined; and a stator disposed so as to be in opposition to a surface of one of said rotors through a gap of a predetermined size, said stator having at least three main poles, each of said main pole having a predetermined number of pole teeth and having a stator coil mounted thereon;

wherein the following conditions are satisfied:
(a) the number Q of said main poles is Q=6k, and k N-poles and k S-poles are formed in 2k main poles for each phase at the time of excitation of each phase, or the number Q of said main poles is Q=3m, and m main poles are formed with the same polarity for each phase at the time of excitation of each phase, where each of k and m is an integer not smaller than 1;
(b) said stator coils are formed with three excitation feeding terminals of a star or delta connection;
(c) a ratio of a tooth width of one of said pole teeth formed on each of said main poles of said stator to a pitch defined between said one pole tooth and another pole tooth adjacent to said one pole tooth is set to be not smaller than $[1-(\frac{2}{5})]/3$, and not larger than $[1+(\frac{2}{5})]/3$;
(d) the number $Nr_3$ of S and N pole pairs of said rotor is set to be $Nr_3=ym(3n\pm1)$ in the case of Q=3m, where n is an integer not smaller than 1 and y is ½ or 1; and
(e) the number $Nr_6$ of S and N pole pairs of said rotor is set to be $Nr_6=yk(6n\pm1)$ in the case of Q=6k.

4. A three-phase stepping motor comprising:

a rotation shaft rotatably supported by a pair of bearings provided in predetermined places of a housing so as to be in opposition to each other;

a permanent-magnet rotor formed in a cylindrical shape so as to have south (S) and north (N) poles magnetized alternately in the direction of rotation on an outer circumferential portion of said rotor, or an induced magnetization rotor having S and N poles disposed alternately in the direction of rotation which are formed in a manner so that permanent magnets with the same polarity are fitted or formed so as to be identical in polarity at their surfaces in grooves formed parallelly to each other at a regular pitch in a surface of a magnetic body formed to be cylindrical in parallel to said rotation shaft and said cylindrical magnetic body is subjected to induced magnetization to form said S and N poles alternately in the surface of said cylindrical magnetic body, or a hybrid rotor constituted by two magnetic disks disposed on said rotation shaft perpendicularly thereto and a permanent magnet magnetized in the direction of rotation axis and held between said two magnetic disks, each of said two magnetic disks having pole teeth formed at a predetermined pitch at edge portions thereof, said two magnetic disks being displaced from each other in the direction of rotation by ½ of said predetermined; and a stator disposed so as to be in opposition to a surface of one of said rotors through a gap of a predetermined size, said stator having at least three main poles, each of said main pole having a predetermined number of pole teeth and having a stator coil mounted thereon;

wherein the following conditions are satisfied:
(a) the number Q of said main poles is 6, and one N pole and one S pole are formed in 2 main poles for each phase at the time of excitation of each phase, or the number Q of said main poles is 6, and two main poles are formed with the same polarity for each phase at the time of excitation of each phase;
(b) the outer shape of said stator is constituted by a portion or whole of four sides of a square, or the outer shape of said stator is an equilateral hexagon, and the rotor-side shape of a yoke portion connecting said main poles which form said stator is circular excluding said main pole portions, or said main poles of magnetic material are formed substantially in parallel with center axes, while the rotor-side shape of a yoke portion connecting said main poles is an equilateral hexagon including sides substantially perpendicular to said center axes.

5. A three-phase stepping motor according to any one of claims 1 to 4 in which said coils are connected in a star connection, wherein a neutral point of said star connection of said coils is connected to an intermediate potential point formed between a first power source and a second power source, or connected to said first power source and said second power source through capacitors with equal capacitance.

6. In a three-phase stepping motor according to any one of claims 1 to 5 in which coils are connected in a star connection with three excitation feeding terminals, a method for driving said three-phase stepping motor wherein the following conditions are satisfied:
(a) the excitation mode is set to two-phase/three-phase excitation;
(b) an electric current supplied to said motor is controlled to take a predetermined electric current value in both cases of two-phase excitation and three-phase excitation; and
(c) two-phase excitation and three-phase excitation are repeated alternately so that a ratio of torque at the time of two-phase excitation to torque at the time of three-phase excitation is substantially √3:1.5.

7. In a three-phase stepping motor according to any one of claims 1 to 5 in which coils are connected in a star connection with three excitation feeding terminals,
a method for driving said three-phase stepping motor wherein the following conditions are satisfied:
(a) the excitation mode is set to two-phase/three-phase excitation; and
(b) the total amount of excitation electric currents supplied to said coils at the time of each excitation is kept zero, while said excitation electric current for each phase is changed in predetermined steps.

8. In a three-phase stepping motor according to any one of claims 1 to 5 in which coils are connected in a star connection with three excitation feeding terminals,
a method for driving said three-phase stepping motor wherein the following conditions are satisfied:
(a) three pairs of switching elements connected in series in the forward direction in each pair are connected between a first power source having a predetermined value and a second power source having a predetermined value, and three excitation feeding terminals are connected to respective junction points of said pairs of switching elements;
(b) diodes are connected or diode functions are formed in reversely parallel with said respective switching elements so that six sets of closed circuits are formed by said switching elements and said diodes; and
(c) said switching elements are driven suitably so as to form an artificial excitation state in which a circulating electric current is made to flow in said closed circuits at an intermediate timing shifting from two-phase excitation to three-phase excitation so that two-phase excitation, artificial three-phase excitation and three-phase excitation are carried out repeatedly.

9. In a three-phase stepping motor according to any one of claims 1 to 5 in which coils are connected in a star connection with three excitation feeding terminals,
a method for driving said three-phase stepping motor wherein the following conditions are satisfied:
(a) the excitation mode is set in two-phase/three-phase excitation, or two-phase/artificial-three-phase/three-phase excitation; and
(b) an electric current supplied to said motor is made larger at the time of three-phase excitation than at the time of two-phase excitation, so as to make torque at the time of two-phase excitation substantially equal to torque at the time of three-phase excitation.

10. In a three-phase distribution type claw-pole stepping motor or in a three-phase cascade type claw-pole stepping motor, wherein each of said three-phase distribution type claw-pole stepping motor and said three-phase cascade type claw-pole stepping motor comprises: a rotation shaft rotatably supported by a pair of bearings provided in predetermined places of a housing so as to be in opposition to each other; a permanent-magnet rotor formed in a cylindrical shape so as to have south (S) and north (N) poles magnetized alternately in the direction of rotation on an outer circumferential portion of said rotor, or an induced magnetization rotor having S and N poles disposed alternately in the direction of rotation which are formed in a manner so that permanent magnets with the same polarity are fitted or formed so as to be identical in polarity at their surfaces in grooves formed parallelly to each other at a regular pitch in a surface of a magnetic body formed to be cylindrical in parallel to said rotation shaft and said cylindrical magnetic body is subjected to induced magnetization to form said S and N poles alternately in the surface of said cylindrical magnetic body; and wherein said three-phase distribution type claw-pole stepping motor further comprises: a stator having 3m claw-pole type magnetic pole tooth groups disposed in opposition to the surface of one of said rotors through an air gap of a predetermined size, each group being provided with a predetermined number of pole teeth disposed opposite to each other from the right and left and gearing with each other at a predetermined gap, and formed circumferentially in the direction of rotation of said rotation shaft; and coils distributed coaxially in a plane perpendicular to said rotation shaft in back portions of said respective magnetic pole tooth groups; and wherein said three-phase cascade type claw-pole stepping motor comprises: a stator constituted by three stator units for the respective phases, each stator unit being provided with a predetermined number of pole teeth disposed in opposition to all over the circumference of said one rotor from the right and left, and having an annular coil disposed coaxially with said pole teeth between a pair of yoke elements gearing with each other at a predetermined distance, said stator units being displaced by rotating by 60/Nr degrees or 120/Nr degrees successively in the circumferential direction, or said rotor being constituted by rotor units for said three phases correspondingly to said stator units, said rotor units being displaced by rotating by 60/Nr degrees or 120/Nr degrees successively in the circumferential direction, while said three phase stator units being disposed in the same circumferential positions;

a method for driving said three-phase stepping motor wherein the following conditions are satisfied:
(a) in the case of said distribution type claw-pole stepping motor, the number of said pole tooth groups and the number Q of said coils are Q=3m, the number $Nr_c$ of S and N pole pairs of said rotor is $Nr_c=m(3n\pm1)$, and there are provided three excitation feeding terminals of a star connection;
(b) in the case of said cascade type claw-pole stepping motor, there are provided three excitation feeding terminals of a star connection or delta connection; and
(c) the excitation mode is set to a two-phase/three-phase excitation mode, and two-phase excitation and three-phase excitation are alternately repeated so that an electric current supplied to said motor takes a predetermined electric current value either in two-phase excitation or in three-phase excitation; or instead said two-phase/three-phase excitation mode, the excitation mode is set to a two-phase/artificial-three-phase/three-phase excitation;
wherein m is an integer of 1 or 2, and n is an integer of 1 or more.

* * * * *